(12) United States Patent
Lin

(10) Patent No.: US 12,517,791 B2
(45) Date of Patent: Jan. 6, 2026

(54) METHOD FOR FACILITATING FRAME ERROR HANDLING AND AN ELECTRONIC DEVICE

(71) Applicant: SK hynix Inc., Icheon-si (KR)

(72) Inventor: Wen Jyh Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/481,848

(22) Filed: Oct. 5, 2023

(65) Prior Publication Data

US 2024/0118974 A1  Apr. 11, 2024

Related U.S. Application Data

(60) Provisional application No. 63/415,166, filed on Oct. 11, 2022.

(30) Foreign Application Priority Data

Jul. 24, 2023  (TW) .................................. 112127570

(51) Int. Cl.
  *G06F 11/00* (2006.01)
  *G06F 11/14* (2006.01)
  *H04L 1/16* (2023.01)
(52) U.S. Cl.
  CPC ............ *G06F 11/1443* (2013.01); *H04L 1/16* (2013.01); *G06F 2201/86* (2013.01)
(58) Field of Classification Search
  CPC ............ G06F 11/1443; G06F 11/1423; G06F 2201/86; H04L 1/16
  See application file for complete search history.

(56) References Cited

U.S. PATENT DOCUMENTS 5,579,476 A  11/1996 Cheng et al.
6,415,313 B1 *  7/2002 Yamada .................. H04L 47/19
                                         709/200
6,880,111 B2 *  4/2005 Fanning .................... H04L 1/16
                                         714/39

(Continued)

FOREIGN PATENT DOCUMENTS

KR    1020140091719 A    7/2014
WO       2022078426 A1    4/2022

*Primary Examiner* — Jonathan D Gibson
(74) *Attorney, Agent, or Firm* — WILLIAM PARK AND ASSOCIATES LTD.

(57) ABSTRACT

A method for facilitating frame error handling and an electronic device are provided. The method is for use in an electronic device capable of communicating with another electronic device. The method comprises the following. In response to an error event in an advanced line encoding mode, closing a first burst transmission and opening a second burst transmission are performed, wherein the advanced line encoding mode indicates that the electronic device is capable of data transmission by using an advanced line encoding having an improved effective data rate as compared to 8b/10b encoding. A lane alignment pattern is transmitted in the advanced line encoding mode from the electronic device to the other electronic device after the second burst transmission is opened. A negative acknowledgement control frame is transmitted in the advanced line encoding mode from the electronic device to the other electronic device after the lane alignment pattern is transmitted.

16 Claims, 20 Drawing Sheets

(56) References Cited

U.S. PATENT DOCUMENTS

| | | | |
|---|---|---|---|
| 7,376,917 B1* | 5/2008 | Lazarut | G06F 11/2294 714/724 |
| 8,644,148 B2* | 2/2014 | Balandin | H04L 47/39 370/231 |
| 8,830,877 B2* | 9/2014 | Jin | H04L 1/1819 370/332 |
| 9,622,111 B2* | 4/2017 | Park | H04W 68/025 |
| 9,727,501 B2* | 8/2017 | Gowravaram | G06F 13/28 |
| 9,998,890 B2* | 6/2018 | Marko | H04W 4/20 |
| 10,039,099 B2* | 7/2018 | Sato | H04W 72/23 |
| 10,075,566 B2* | 9/2018 | Lee | H04L 69/22 |
| 10,154,402 B2* | 12/2018 | Agiwal | H04W 4/70 |
| 10,254,972 B2 | 4/2019 | Iwai et al. | |
| 10,534,034 B2 | 1/2020 | Froelich et al. | |
| 10,587,362 B2* | 3/2020 | Rico Alvarino | H04L 1/0057 |
| 10,606,710 B2 | 3/2020 | Kim et al. | |
| 10,630,410 B2* | 4/2020 | Parkvall | H04L 65/1023 |
| 10,686,472 B2* | 6/2020 | Hosseini | H03M 13/091 |
| 10,700,810 B2* | 6/2020 | Pandey | H04L 1/0041 |
| 10,812,229 B2* | 10/2020 | Han | H04L 1/0041 |
| 10,834,661 B2* | 11/2020 | Joseph | H04W 40/248 |
| 10,873,429 B1* | 12/2020 | Kwon | H04L 1/0045 |
| 11,070,259 B2* | 7/2021 | Manolakos | G01S 5/0218 |
| 11,336,445 B2 | 5/2022 | Anslot et al. | |
| 11,419,004 B2* | 8/2022 | Ramos | H04W 72/569 |
| 11,444,721 B2* | 9/2022 | Li | H04L 1/0061 |
| 11,546,087 B2 | 1/2023 | Jeong et al. | |
| 11,687,420 B2* | 6/2023 | Lin | G06F 11/0745 714/5.11 |
| 11,722,469 B2 | 8/2023 | Kravitz et al. | |
| 11,770,844 B2* | 9/2023 | Zhou | H04L 1/1819 |
| 11,847,459 B2* | 12/2023 | Agarwal | G06F 12/0815 |
| 11,943,053 B2* | 3/2024 | Chen | H04L 69/22 |
| 12,237,919 B2* | 2/2025 | Zheng | H04L 1/0009 |
| 12,356,201 B2* | 7/2025 | Wei | H04W 72/0446 |
| 12,363,043 B2* | 7/2025 | Mate | H04L 65/65 |
| 12,396,023 B2* | 8/2025 | Yi et al. | H04L 27/26025 |
| 12,414,172 B2* | 9/2025 | Gupta | G06F 9/54 |
| 2008/0285678 A1 | 11/2008 | Karaki | |
| 2010/0165896 A1 | 7/2010 | Gong et al. | |
| 2011/0066921 A1* | 3/2011 | Blackmon | H04L 1/1845 714/763 |
| 2011/0076953 A1* | 3/2011 | Macrae | H04B 7/12 714/748 |
| 2012/0120960 A1 | 5/2012 | Nishioka | |
| 2013/0061099 A1* | 3/2013 | Radulescu | H04L 1/1858 714/708 |
| 2013/0179628 A1 | 7/2013 | Sekiya | |
| 2013/0227509 A1* | 8/2013 | Chang | G06F 30/398 716/111 |
| 2016/0246667 A1* | 8/2016 | Kumar Rao | G06F 11/0793 |
| 2016/0364309 A1 | 12/2016 | Park et al. | |
| 2017/0093521 A1* | 3/2017 | Wang | H04L 1/0009 |
| 2017/0220517 A1* | 8/2017 | Khan | H04B 1/40 |
| 2017/0286357 A1* | 10/2017 | Chellappan | G06F 13/4286 |
| 2018/0132263 A1* | 5/2018 | Nuggehalli | H04W 72/569 |
| 2019/0052736 A1* | 2/2019 | Turtinen | H04L 69/22 |
| 2019/0182809 A1* | 6/2019 | Liu | H04L 1/0045 |
| 2019/0191330 A1* | 6/2019 | Dao | H04L 12/4633 |
| 2020/0081646 A1 | 3/2020 | Byun et al. | |
| 2020/0082891 A1 | 3/2020 | Lee et al. | |
| 2020/0192856 A1 | 6/2020 | Lee et al. | |
| 2020/0356519 A1* | 11/2020 | Ballantyne | G06F 13/4282 |
| 2020/0379833 A1* | 12/2020 | Hsiao | G06F 11/0745 |
| 2022/0294476 A1 | 9/2022 | Seol et al. | |
| 2023/0056001 A1* | 2/2023 | Lin | G06F 11/0772 |
| 2023/0133677 A1* | 5/2023 | Sun | H04L 1/0067 370/328 |
| 2023/0188256 A1* | 6/2023 | Yu | H04L 1/0041 714/774 |
| 2023/0239073 A1 | 7/2023 | Bharadwaj et al. | |
| 2023/0269311 A1* | 8/2023 | Liu | H04B 7/15 370/235 |
| 2023/0377618 A1* | 11/2023 | Lin | G11C 7/1066 |
| 2023/0396360 A1 | 12/2023 | Zhang et al. | |
| 2024/0014943 A1 | 1/2024 | Kuo et al. | |
| 2024/0089236 A1* | 3/2024 | Li | H04L 63/0263 |
| 2024/0121326 A1 | 4/2024 | Lin | |
| 2024/0340322 A1* | 10/2024 | Bouazizi | H04L 65/80 |
| 2024/0397399 A1 | 11/2024 | Gupta et al. | |
| 2025/0047400 A1* | 2/2025 | Peyla | H04H 20/423 |
| 2025/0097954 A1* | 3/2025 | Sengupta | H04L 1/0057 |
| 2025/0142440 A1* | 5/2025 | Lee | H04W 36/362 |
| 2025/0158765 A1* | 5/2025 | Echigo | H04L 5/0048 |

* cited by examiner

METHOD FOR FACILITATING FRAME ERROR HANDLING AND AN ELECTRONIC DEVICE

CROSS-REFERENCE TO RELATED APPLICATION

This non-provisional application claims the benefit under 35 U.S.C. § 119(e) of U.S. Provisional Patent Application No. 63/415,166 filed on Oct. 11, 2022, and claims priority under 35 U.S.C. § 119(a) to Taiwanese Patent Application No. 112127570 filed on Jul. 24, 2023, in the Taiwan Intellectual Property Office, the entire contents of which are hereby incorporated by reference.

BACKGROUND OF THE INVENTION

1. Field of the Invention

The present disclosure relates to an electronic device and a method therefor, and in particular to methods for facilitating frame error handling for an interconnection protocol capable of performing an advanced line encoding, a controller therefor, and an electronic device therefor such as a host device or a storage device.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing a line coding scheme having an improved effective data rate are provided, and are suitable for an electronic device capable of communicating with another electronic device according to the interconnection protocol.

Embodiments of a method for facilitating frame error handling for an electronic device are provided. The method is for use in an electronic device capable of communicating with another electronic device. The method comprises the following. In response to an error event in an advanced line encoding mode, closing a first burst transmission and opening a second burst transmission are performed, wherein the advanced line encoding mode indicates that the electronic device is capable of data transmission by using an advanced line encoding having an improved effective data rate as compared to 8b/10b encoding. A lane alignment pattern is transmitted in the advanced line encoding mode from the electronic device to the other electronic device after the second burst transmission is opened. A negative acknowledgement control (NAC) frame is transmitted in the advanced line encoding mode from the electronic device to the other electronic device after the lane alignment pattern is transmitted.

Embodiments of an electronic device operable to communicate with another electronic device are provided. The electronic device comprises a controller. The controller is capable of, in response to an error event in an advanced line encoding mode, closing a first burst transmission and opening a second burst transmission, wherein the advanced line encoding mode indicates that the electronic device is capable of data transmission by using an advanced line encoding having an improved effective data rate as compared to 8b/10b encoding. The controller is capable of transmitting a lane alignment pattern in the advanced line encoding mode from the electronic device to the other electronic device after the opening of the second burst transmission and transmitting a negative acknowledgement control (NAC) frame in the advanced line encoding mode from the electronic device to the other electronic device after the transmitting of the lane alignment pattern.

In some embodiments of the method or the electronic device, the error event indicates that a data frame received by the electronic device in the advanced line encoding mode has an error.

In some embodiments of the method or the electronic device, the NAC frame is capable of triggering re-transmission of the data frame at the other electronic device.

In some embodiments of the method or the electronic device, the error event indicates that the electronic device does not receive an acknowledgment in the advanced line encoding mode within a time interval after transmitting a frame, wherein the frame is an unacknowledged transmitted frame.

In some embodiments of the method or the electronic device, the lane alignment pattern is a first lane alignment pattern and the method further comprises or the electronic device is capable of performing operations comprising: sending a request to perform link re-initialization after the first lane alignment pattern is transmitted; closing the second burst transmission and opening a third burst transmission in the advanced line encoding mode after the link re-initialization is performed; and transmitting a second lane alignment pattern in the advanced line encoding mode from the electronic device to the other electronic device after the third burst transmission is opened, wherein the NAC frame is transmitted after the second lane alignment pattern is transmitted.

In some embodiments of the method or the electronic device, the error event is capable of triggering re-transmission of the unacknowledged transmitted frame at the electronic device after the NAC frame is transmitted.

In some embodiments of the method or the electronic device, the advanced line encoding is based on a 128b/129b line encoding, 128b/130b line encoding, 128b/132b line encoding, 256b/257b line encoding, 256b/258b line encoding, or 256b/260b line encoding.

In some embodiments of the method or the electronic device, closing the first burst transmission includes transmitting an end-of-burst sequence for a time interval based on a unit of information for data transmission according to the advanced line encoding.

Various embodiments are provided below according to the technologies, for example, methods for an interconnection protocol capable of performing advanced line coding, controllers, and electronic devices.

DETAILED DESCRIPTION OF THE INVENTION

Figure 1:
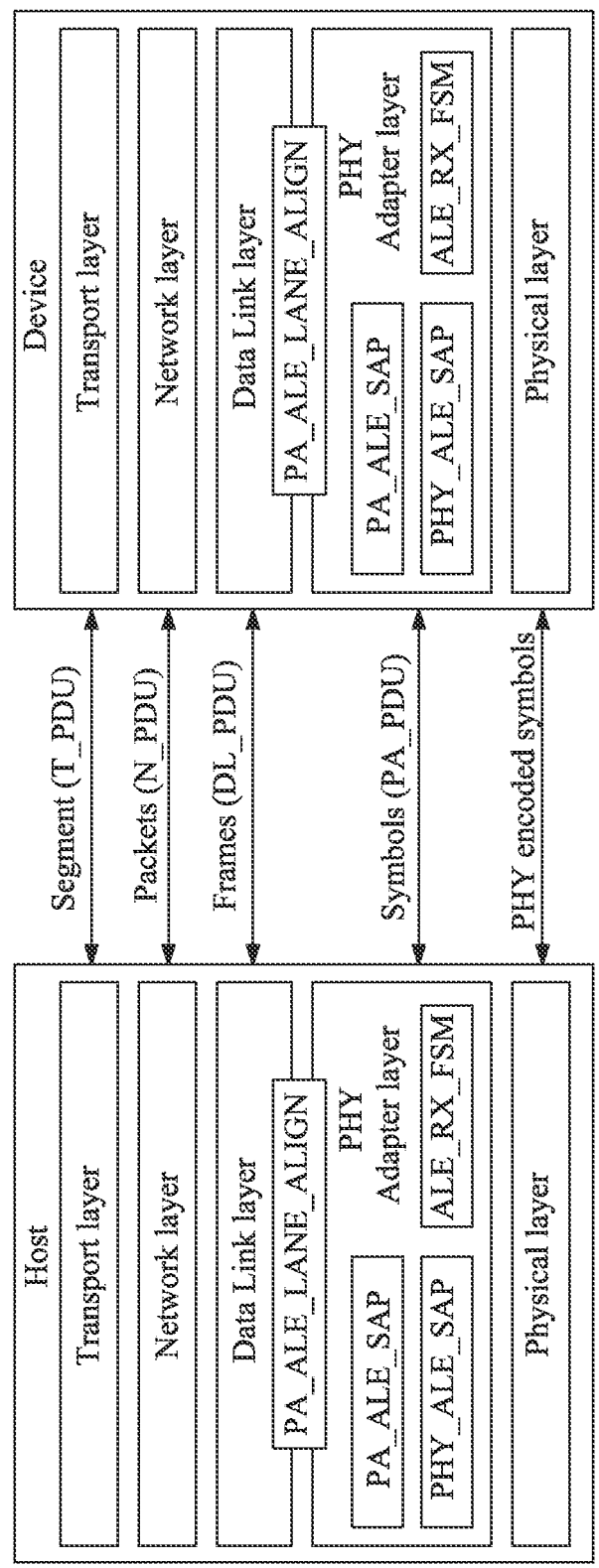
FIG. 1 is a schematic diagram illustrating new service access points (SAPs) in a modified UFS system to implement an advanced line encoding (ALE) according to an embodiment of the present disclosure.

To facilitate understanding of the object, characteristics and effects of this present disclosure, embodiments together with the attached drawings for the detailed description of the present disclosure are provided.

In the present disclosure, the inventor proposes an interconnection protocol with an advanced line coding scheme. The advanced line coding scheme hereafter is referred to as Advance Line Encode or advanced line encoding (ALE) which indicates a line coding scheme having an improved effective data rate as compared to 8b/10b coding scheme. For example, line coding schemes such as a 128b/129b, 128b/130b, 128b/132b, 256b/257b, 256b/258b, or 256b/260b coding scheme, or so on, have reduced overhead, as compared to 8b/10b coding scheme, and thus have improved effective data rates as compared to 8b/10b coding scheme. As an example, in a 128b/130b coding scheme, every 128-bit payload data is converted to 130-bit "block" to be transmitted and the 128b/130b coding has 1.54% overhead and an effective data rate of 98.46% accordingly. Likewise, in other examples, 128b/129b, 128b/132b, 256b/257b, 256b/258b, or 256b/260b coding scheme or so on can be implemented as an advanced line encoding scheme.

The interconnection protocol can be derived from the UFS standard. The interconnection protocol can also be regarded as a proposed or enhanced version of the UFS standard in the future. The advanced line coding can be implemented in the interconnection protocol as an advanced operation mode, or referred to as an advanced line encoding (ALE) mode, which indicates that an electronic device compliant with the interconnection protocol is capable of data transmission by using an advanced line encoding scheme.

In the present disclosure, error handling operations for data link frame re-transmission (or replay) in the advanced line encoding mode are concerned in order to facilitate implementation of the advanced line encoding mode. Embodiments of DL Frame replay operations which are obtained by modification of the current UniPro specification are provided below to facilitate implementation of enhanced line coding scheme. The DL frame re-transmission operations can also be adopted in further derivations of the interconnection protocol.

In order to facilitate error handling operations in the advanced line encoding mode of the proposed interconnection protocol, symbol alignment and symbol lock issues are addressed with examples in the present disclosure.

In the advanced line encoding mode, a signaling scheme for transmission of bits different from conventional signaling schemes (such as Non-Return-to-Zero (NRZ) or Pulse Width Modulation (PWM)) available in the current UFS standard, may be further adopted in conjunction with the advanced line encoding scheme to enhance overall data throughput. For example, signaling schemes for bits transmission such as pulse amplitude modulation (PAM) n-level (PAM-n) can be adopted together with the advanced line encoding scheme, wherein n is an integer such as 3, 4, 5, 6, 8, or 16. The embodiments of DL Frame replay operations which are obtained by modification of the current UniPro specification can also facilitate implementation of an advanced line encoding scheme in conjunction with the signaling scheme such as PAM-4 or so on.

Various embodiments are provided below for facilitating the interconnection protocol based on the ALE, and are suitable for an electronic device capable of communicating with another electronic device according to the interconnection protocol.

As mentioned above, the interconnection protocol with the ALE can be derived from the UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol with the ALE can be implemented and derived from architecture of the conventional UFS system by using a modified UFS system implementing a modified version of UniPro and a modified version of M-PHY for the ALE. Further, the interconnection protocol with the ALE can also be implemented in a communication system including a host and a device each having respective link layer (such as a modified version of UniPro) and respective physical layer (such as a modified version of M-PHY) both compliant with the ALE.

Referring to FIG. 1, service access points (SAPs) in a modified UFS system are illustrated to implement an advanced line encoding (ALE) according to an embodiment of the present disclosure. In this embodiment as shown in FIG. 1, either the host or device of the modified UFS system has new service access points (SAPs) associated with the facilitation of ALE in the protocol stack. For example, a PHY Adapter (PA) service access point for ALE, denoted by PA_ALE_SAP, provides services in the PA layer for data transfer for ALE. In addition, a service access point for PHY layer (e.g., M-PHY) with ALE, denoted by PHY_ALE_SAP, provides services in the PA layer for association of the PA layer with PHY layer. A PA service access point for lane alignment for ALE, denoted by PA_ALE_LANE_ALIGN, provides services in the PA layer and to DL layer for lane alignment. Further, a finite state machine (FSM) for a receiver to support operations in the advanced line encoding mode, denoted by ALE_RX_FSM, is provided in the PA layer as shown in FIG. 1, for example.

As illustrated in FIG. 1, on one side (e.g., a host) of the communication system, the layers of the UniPro, such as the transport layer to PA layer, and the PHY layer communicate with their counterparts on the peer side (e.g., a device) by using their respective protocol data units (e.g., segments (T_PDU), packets (N_PDU), frames (DL_PDU), symbols (PA_PDU), and PHY encoded symbols), wherein the PA layer and PHY layer are configured to support the ALE. To implement an advanced line encoding, one or more blocks are generated in the PA layer for transmission to a peer side, wherein each block includes a plurality of symbols or protocol data units (PDUs) from the DL or PA layer. In this regard, the SAPs for data transfer or related operations in the advanced line encoding mode are provided in the modified UFS system.

Figure 2:
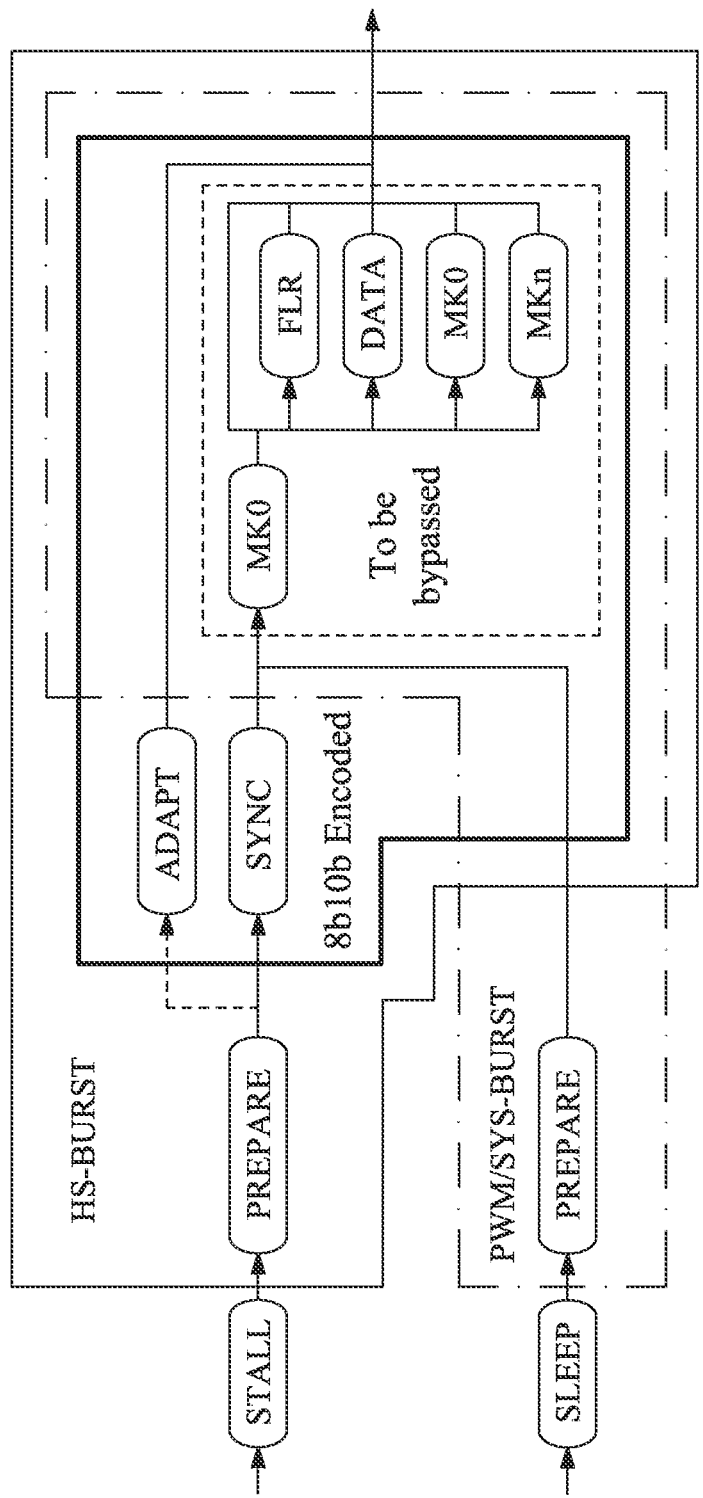
FIG. 2 is a schematic diagram illustrating modifications to M-PHY to facilitate data transmission using ALE according to an embodiment of the present disclosure.

In addition, FIG. 2 illustrates modifications to M-PHY to facilitate data transmission using ALE according to an embodiment of the present disclosure. Referring to FIG. 2, it is assumed that 8b/10b coding in M-PHY can be bypassed in a physical layer for the ALE derived from the current M-PHY, wherein the physical layer for the ALE is referred to as a modified physical layer or a modified M-PHY. In some embodiments, the modified physical layer is implemented as an interface circuit to perform transmission of bits of the "blocks" as mentioned above from the modified PA layer in the advanced line encoding mode in which 8b/10b coding is bypassed. In this manner, the modified physical layer in the advanced line encoding mode can be configured to perform bits transmission for the blocks and the advanced line encoding in which the blocks are encoded is performed in the modified PA layer. This approach leads to flexibility of implementation of the PA layer and the physical layer of the interconnection protocol in terms of line coding scheme. For example, the modified M-PHY may be implemented to perform bits transmission in the advanced line encoding mode in addition to conventional 8b/10b coding or implemented to be dedicated for the ALE instead of 8b/10b coding. For example, the modified M-PHY may be implemented to perform bits transmission using a specific signaling scheme, such as PAM-n (e.g., PAM-4), which can be utilized in the advanced line encoding mode. For example, in an implementation of the modified M-PHY, the interface between the modified PA layer and the modified physical layer may be an advanced line encoding interface with a larger bus width, e.g., a bus width of 80 bits or more, instead of a 64-bit Reference M-PHY MODULE Interface (RMMI). In addition, FIG. 2 illustrates a BURST sub-state machine specified by M-PHY specification (such as version 5.0), wherein the terms such as STALL, PREPARE, ADAPT, SYNC, SLEEP, PREPARE, HS-BURST, PWM/SYS BURST, and so on are defined by the M-PHY specification, which one of ordinary skill in the art would understand accordingly, and for the sake of brevity, their details will not be repeated herein.

Figure 3:
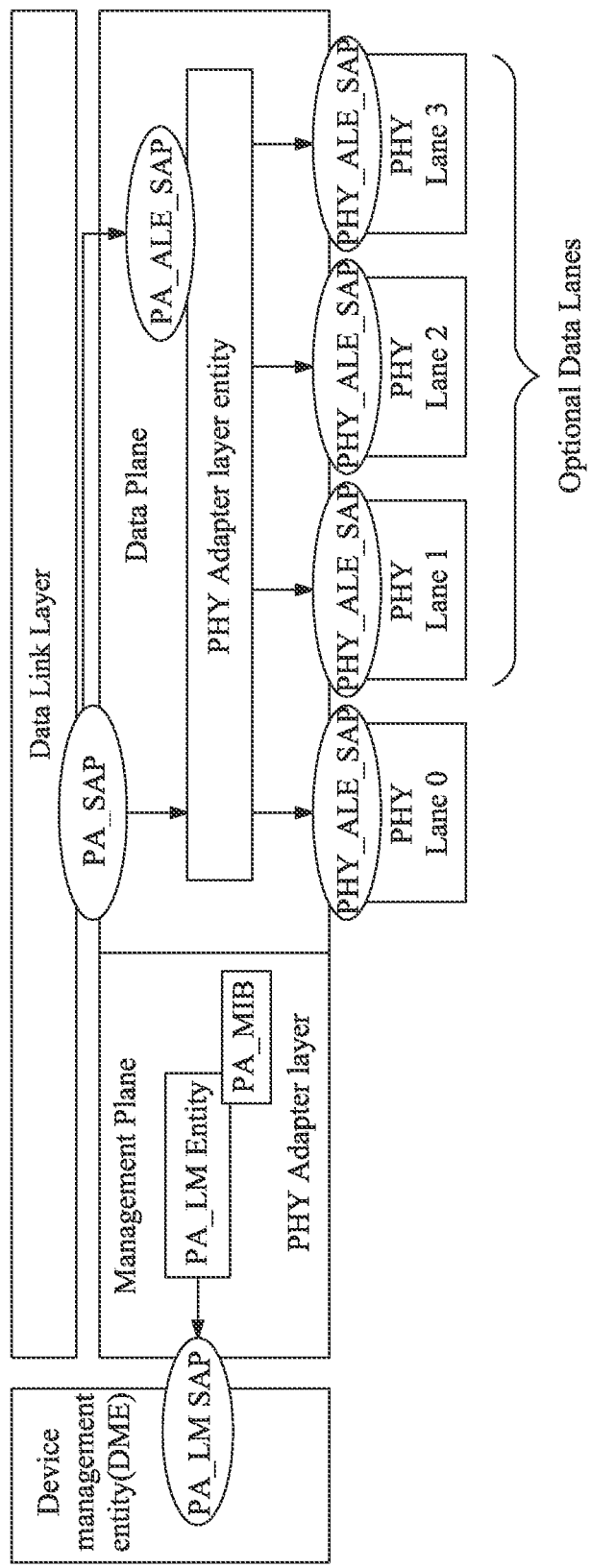
FIG. 3 is a schematic diagram of an embodiment of PHY adapter layer SAP model for ALE operations.

FIG. 3 illustrates an embodiment of PHY adapter layer SAP model for ALE operations in a schematic diagram. A modified PHY adapter (PA) layer illustrated in FIG. 3 for ALE can be derived from the PHY Adapter Layer SAP model of UniPro version 2.0. As shown in FIG. 3, a data link layer, a PHY Adapter layer, and a device management entity (DME) can be derived from the PHY Adapter Layer SAP model of UniPro version 2.0. The PHY Adapter layer, for example, includes PA_SAP and PHY Adapter layer entity in data plane; and PA layer management (PA_LM) entity, PA Layer-specific Management Information Base (PA_MIB), and PA layer management service access point (PA_LM SAP) in management plane. As compared to the PA layer of UniPro version 2.0, the modified PA layer has the PHY Adapter (PA) service access point for ALE (PA_ALE_SAP) in the modified PA layer to provide services in the modified PA layer, especially for the PHY Adapter service access point (PA_SAP). In addition, the service access point for PHY layer with ALE (PHY_ALE_SAP) provides services to the modified PA layer, for example, the PHY Adapter layer entity. The modified PA Layer is associated with at least one PHY entity via its PHY_ALE_SAP, wherein there may be one or more PHY entities corresponding to data lanes, denoted by PHY Lane 0 to PHY Lane 3, and PHY Lane 1 to PHY Lane 3 are optional. In this manner, the implementations of the modified PA layer and modified M-PHY with respect to the ALE are hidden from the data link layer. Thus, the PHY adapter layer SAP model for ALE facilitates the implementation of the interconnection protocol with the ALE and reduces its implementation complexity.

For implementations of the interconnection protocol, PA_ALE_SAP, PHY_ALE_SAP, PA_ALE_LANE_ALIGN, and ALE_RX_FSM, as previously mentioned in relative to FIG. 1 or 3, are exemplified in the following embodiments.

In some embodiments as follows, the PHY Adapter (PA) service access point for ALE, or PA_ALE_SAP, includes a plurality of service primitives for data transfer.

In an embodiment of the service access point PA_ALE_SAP, a service primitive for data transfer (or referred to as a data transfer primitive or a primitive), denoted by PA_ALE_ESCDATA.req, is provided. The PA_ALE_ESCDATA.req primitive is used to request the transmission of ALE escaped payload data. The ALE escaped payload data indicates the escaped payload data to be transmitted by communication using an ALE scheme. The semantics of this primitive are: PA_ALE_ESCDATA.req(ALE_EscType, ALE_EscParam), wherein an ALE_EscType parameter specifies escaped data type and the corresponding escaped payload data is given with an EscParam parameter, as exemplified in TABLES 1 and 2 below. The PA_ALE_ESCDATA.req primitive is generated, for example, when a PA Layer ALE escaped data symbol (i.e., ALE escaped payload data) is to be transmitted over a link, wherein the link is a bidirectional interconnection between two devices (e.g., a host and a device). On receipt of the PA_ALE_ESCDATA.req primitive, the PA Layer transfers information associated with the ALE_EscType and ALE_EscParam parameters over the link via the underlying physical layer.

TABLE 1 illustrates examples of the primitive parameters for PA_ALE_SAP.

TABLE 1

| Name | Type | Valid Range | Description |
|---|---|---|---|
| ALE_Data | Integer | 0 to 65535 | Normal payload data |
| ALE_EscType | Enumeration | ESC_ALE | Escaped data type (See below) |
| ALE_EscParam | Integer | 0 to 127 | Escaped payload data |

TABLE 2 illustrates examples of the parameters ALE_EscType and ALE_EscParam for ALE.

As illustrated in TABLE 2, the control symbol types (or escaped data type), denoted by ALE_EscType, of a frame structure for the ALE may have specific values corresponding to escaped parameters (denoted by ALE_EscParam) of the control symbol (or control PDU) for the ALE. The control symbol types, such as Start of Frame (SOF), Acknowledgment and Flow Control (AFC), Continuation of Preempted Frame (COF), Negative Acknowledgment Control (NAC), <FLR, FLR>, <MK4, MK4>, <MK2, FLR>, <MK2, MK2>, Physical Adapter Control Protocol (PACP), End of Frame with even number of bytes (EOF_EVEN), and End of Frame with odd number of bytes (EOF_ODD) are listed and provided with corresponding values in TABLE 2, wherein FLR stands for Filler and MK2 and MK4 stand for Marker2 and Marker4 respectively. In TABLE 2, TC stands for traffic class, CReq stands for credit transmit request, RReq stands for reset link request, and frame sequence number is used with each data frame, as they can be derived from or implemented according to the conventional UniPro specification or further implemented with additional or different functionality. Some fields are reserved (denoted by Rsvd).

In addition, as compared to the 8b/10b coding scheme used in the conventional UniPro and M-PHY specifications, it is not necessary for an implementation of the advanced line encoding with data scrambling to use the conventional UniPro IDLE symbol encoding. M-PHY symbol pairs <MK3, FLR>, <MK3, DAT>, <DAT, FLR> are also not used in the implementation of the advanced line encoding.

In an embodiment of the service access point PA_ALE_SAP, a service primitive for data transfer, denoted by PA_ALE_ESCDATA.ind, is further provided. The PA_ALE_ESCDATA.ind primitive is used to report the reception of a PA layer ALE escaped payload data symbol. The semantics of this primitive are: PA_ALE_ESCDATA.ind (ALE_EscType, ALE_EscParam), wherein an ALE_EscType parameter specifies escaped data type and the corresponding escaped payload data is given with an EscParam parameter, as exemplified in TABLES 1 and 2 above. The PA_ALE_ESCDATA.ind primitive is generated, for example, when a PA Layer ALE escaped data symbol is received over the link via the underlying physical layer. On receipt of the PA_ALE_ESCDATA.ind primitive, the PA Layer consumes the information associated with the ALE_EscType and ALE_EscParam parameters.

In an embodiment of the service access point PA_ALE_SAP, a service primitive for data transfer, denoted by

TABLE 2

| | T | ALE_EscParam | | | | | | POS | CRC-5 |
|---|---|---|---|---|---|---|---|---|---|
| ALE_EscType | bit 15 | bit 14 | bit 13 | bit 12 | bit 11 | bit 10 | bit 9 | bit 8 | bit 7:5 | Bit 4:0 |
| SOF | | 2'b00 | | 0 | Rsvd | Rsvd | TC | | | |
| AFC | | 2'b00 | | 1 | Rsvd | CReq | TC | | | |
| COF | | 2'b01 | | 2'b00 | | Rsvd | TC | | | |
| NAC | | 2'b01 | | 2'b01 | | RReq | Rsvd | Rsvd | | |
| <FLR, FLR> | | 2'b01 | | 4'b1000 | | | | Rsvd | | |
| <MK4, MK4> | | 2'b01 | | 4'b1001 | | | | Rsvd | | |
| <MK2, FLR> | | 2'b01 | | 4'b1010 | | | | Rsvd | | |
| <MK2, MK2> | | 2'b01 | | 4'b1011 | | | | Rsvd | | |
| Reserved | | 2'b01 | | 4'b1100 | | | | Rsvd | | |
| Reserved | | 2'b01 | | 4'b1101 | | | | Rsvd | | |
| Reserved | | 2'b01 | | 4'b1110 | | | | Rsvd | | |
| PACP | | 2'b01 | | 4'b1111 | | | | Rsvd | | |
| EOF_EVEN | | 2'b10 | | Frame Sequence Number | | | | | | |
| EOF_ODD | | 2'b11 | | Frame Sequence Number | | | | | | |

PA_ALE_DATA.req, is provided. The PA_ALE_DATA.req primitive is used to requests the transmission of payload data. The semantics of this primitive are: PA_ALE_DATA.req(ALE_Data), wherein an ALE_DATA parameter specifies payload data, as exemplified in TABLE 1 above. The PA_ALE_DATA.req primitive is generated, for example, when a PA Layer ALE data symbol (i.e., the payload data) is to be transmitted received over the link. On receipt of the PA_ALE_DATA.req primitive, the PA Layer transfers the payload data over the link via the underlying physical layer.

In an embodiment of the service access point PA_ALE_SAP, a service primitive for data transfer, denoted by PA_ALE_DATA.ind, is further provided. The PA_ALE_DATA.ind primitive is used to report the reception of a PA layer ALE data symbol over the link. The semantics of this primitive are: PA_ALE_DATA.ind(ALE_Data), wherein an ALE_Data parameter specifies payload data, as exemplified in TABLE 1 above. The PA_ALE_DATA.ind primitive is generated, for example, when a PA Layer ALE data symbol is received over the link via the underlying physical layer. On receipt of the PA_ALE_DATA.ind primitive, the PA Layer consumes the payload data.

Further, as illustrated in FIG. 3, the PA Layer is associated with each PHY entity, which corresponds to a data lane, via its PHY_ALE_SAP. In order to facilitate an advanced line encoding adopted in the interconnection protocol, one or more ALE blocks are generated and processed in the PA layer of the interconnection protocol for transmission to a peer side.

In some embodiments, the service access point PHY_ALE_SAP is implemented to perform block management for data transfer based on an ALE. The following provides examples of the service access points PHY_ALE_SAP.

Regarding the service access point PHY_ALE_SAP, the block management can be implemented to perform ALE data block generation and ALE control block generation. In the modified M-PHY for the ALE, a unit of information for data transmission according to the ALE may be a data block (or called ALE data block) or a control block (or called ALE control block), which is generated according to an ALE block. An ALE block (or called a PDU block) includes a specific number of PDUs from the PA_ALE_SAP, such as one or more of control information (denoted by CTRL_INFO) PDU or data PDU. The specific number of PDU of the ALE block depends on the type of the ALE coding scheme to be adopted. For example, if a 128b/130b or 128b/132b coding scheme is adopted, one ALE block includes 8 PDUs (128 bits). In another example of using a 256b/257b, 256b/258b, or 256b/260b coding scheme, one ALE block includes 16 PDUs (256 bits). In a further example of using a 512b/514b or 512b/516b coding scheme, one ALE block includes 32 PDUs (512 bits).

Figure 4A:
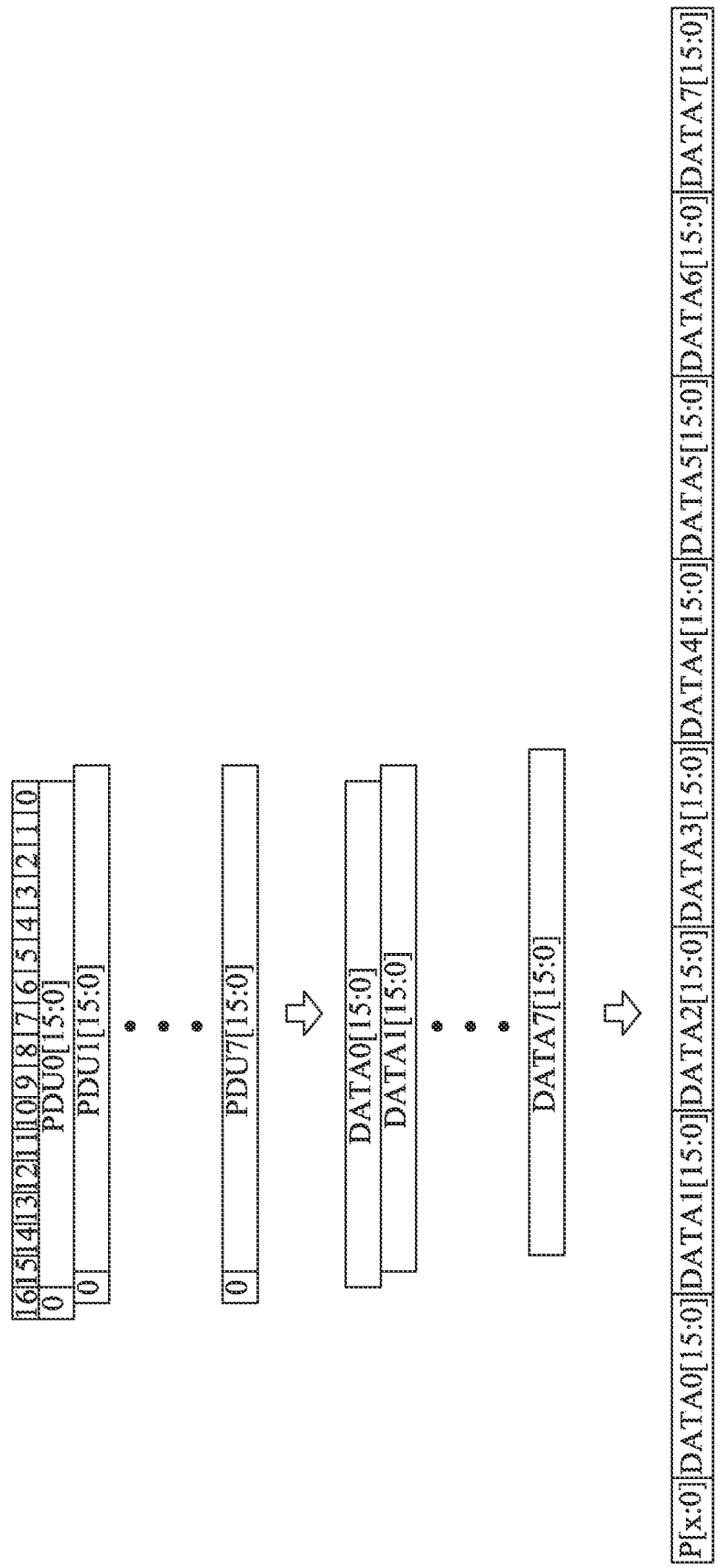
FIG. 4A is a schematic diagram illustrating an example of ALE data block generation.

In an embodiment, PHY_ALE_SAP can be implemented to perform ALE data block generation. An ALE data block includes synchronization header (denoted by SyncHdr) bits (or called preamble bits) and a specific number of the data PDUs (e.g., 8 PDUs). The format of an ALE data block can be represented by {SyncHdr bits, PDUx8}. FIG. 4A illustrates an example of ALE data block generation in a schematic diagram. The PHY_ALE_SAP can be implemented to receive a plurality of data PDUs, for example, denoted by DATA0[15:0], DATA1[15:0], . . . , DATA7[15:0] as shown on the middle portion of FIG. 4A, from the PA_ALE_SAP. For example, the PA_ALE_SAP directly maps a number of DL data PDUs, for example, denoted by PDU0[15:0], PDU1 [15:0], . . . , PDU7[15:0] as shown on the upper portion of FIG. 4A into the data PDUs (e.g., DATA0[15:0] to DATA7 [15:0]). The PHY_ALE_SAP can be implemented to generate an ALE data block by adding a synchronization header (e.g., denoted by P[x:0]) and assembling a specific number of the received data PDUs (e.g., 8 PDUs), as shown on the lower portion of FIG. 4A.

In the above or other examples, P[x:0] represents the SyncHdr bits, wherein x indicates an integer equal to or greater than zero. In the case of 128b/129b coding scheme, the size of SyncHdr bits is 1 (i.e., x=0), wherein forward error correction can be applied to the ALE coding scheme to enhance its reliability. In the case of 128b/130b coding scheme, the size of SyncHdr bits is 2 (i.e., x=1). In the case of 128b/132b coding scheme, the size of SyncHdr bits is 4 (i.e., x=3). Further, in some examples, in case of 256b/257b coding scheme, 256b/258b coding scheme, or 256b/260b coding scheme or so on, the size of SyncHdr bit(s) can be set in similar manners as illustrated above for 128b/129b, 128b/130b, or 128b/132b coding scheme, respectively, whenever appropriate.

Figure 4B:
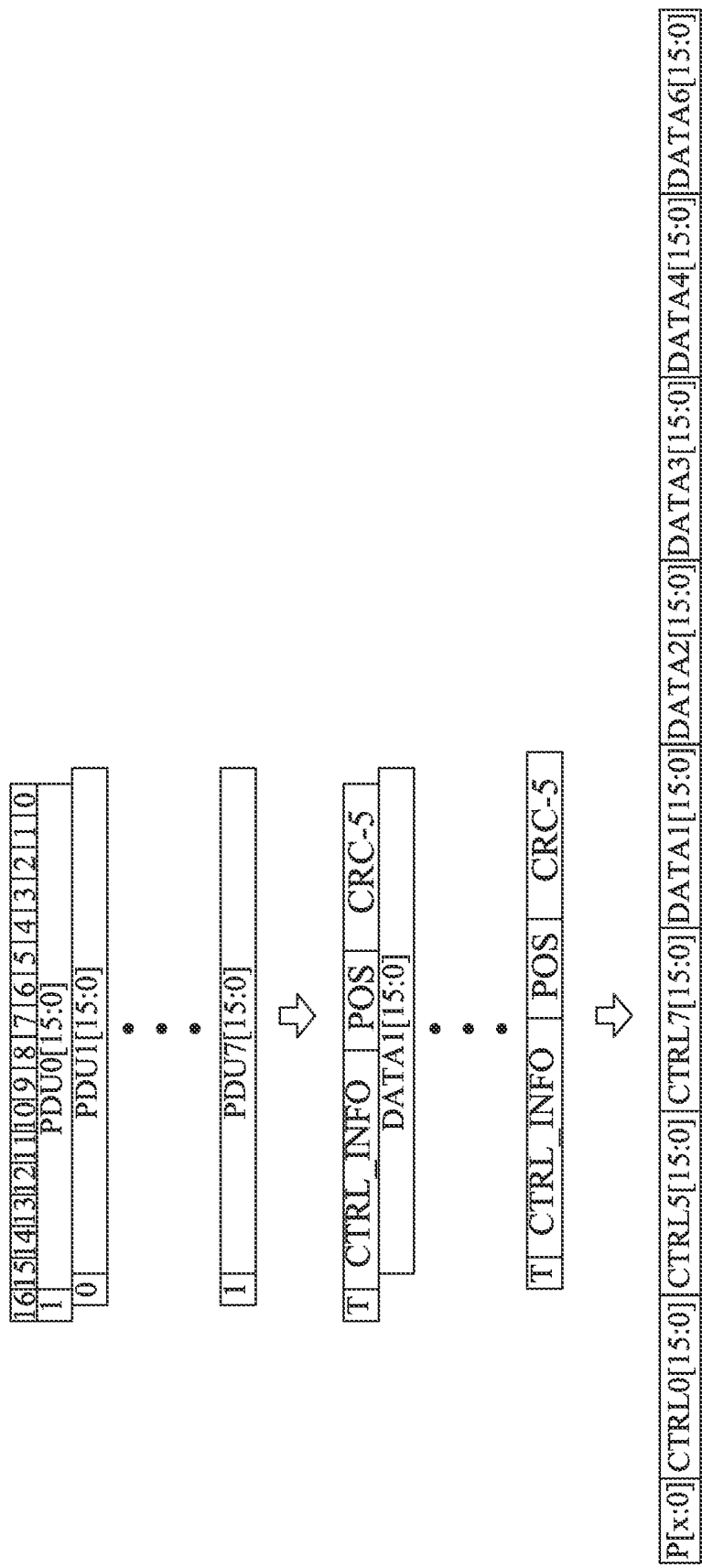
FIG. 4B is a schematic diagram illustrating an example of ALE control block generation.

In another embodiment, the PHY_ALE_SAP is implemented to perform ALE control block generation. An ALE control block includes synchronization header (denoted by SyncHdr) bits (or called preamble bits), at least one control information (CTRL_INFO) PDU (or simply referred to as control PDU), and may include one or more data information PDU (or simply referred to as data PDU), up to a specific number of PDUs (e.g., 8 PDUs). The format of an ALE control block, for example, is represented by {SyncHdr bit, CTRL_INFO PDUs, Data PDUs}. FIG. 4B illustrates an example of ALE control block generation in a schematic diagram. The PHY_ALE_SAP, for example, is implemented to receive a plurality of PDUs, which may include one or more CTRL_INFO PDUs and data PDUs as shown on the middle portion of FIG. 4B, from the PA_ALE_SAP. For example, the PA_ALE_SAP maps a number of PDUs from the DL layer or the PA layer into a number of PDUs for ALE. For example, the PDUs, denoted by PDU0[15:0], PDU1[15:0], . . . , PDU7[15:0], as shown on the upper portion of FIG. 4B, may include at least one ESC_DL related PDUs or ESC_PA related PDUs from the DL layer or the PA layer. The PDUs for ALE, as shown on the middle portion of FIG. 4B, may include CTRL_INFO PDUs and data PDUs. The PHY_ALE_SAP can be implemented to generate an ALE control block according to the PDUs for ALE by adding a synchronization header (e.g., denoted by P[x:0]) and assembling a specific number of the PDUs (e.g., 8 PDUs) including at least one control PDU, as shown on the lower portion of FIG. 4B. In the ALE control block, all of the CTRL_INFO PDUs are arranged in series after the synchronization header, as illustrated in FIG. 4B. In other words, the PHY_ALE_SAP can be implemented to be capable of reordering the PDUs for ALE to generate the ALE control block.

In FIG. 4B, a CTRL_INFO PDU, for example, may be originated from the DL or PA layer and includes control information (CTRL_INFO), a T tag, and a position (POS) field. The control information indicates ALE_EscParam, as exemplified in TABLE 2. The T tag (or referred to as a link list field) indicates a link list in a control block. The POS field indicates the position of DL_CTRL_INFO position in an ALE block. Each ALE block has a specific number of PDUs, such as 8 PDUs (128 bits). Optionally, the CTRL_INFO PDU can end with a cyclic redundancy check (CRC) field, such as a CRC-5 field indicating using CCITT-CRC5 to cover and protect fields from T, CTRL_INFO to POS in order to enhance reliability of transmission, wherein CCITT stands for International Telegraph and Telephone Consultative Committee.

In addition, the bit width of POS field is variable for different implementations of ALE. An ALE block indicates a group of a specific number of PDUs to be transmitted by communication according to an ALE and can be referred to a PDU block as well. In the above format as shown in FIG. 4B or TABLE 2, the bit width of the POS field is 3 bits for an implementation of ALE with an ALE block of 8 PDUs (or referred to as 8-PDU ALE block). In case of a 16-PDU ALE block, its POS field can be 4 bits wide and CRC-5 field will no longer be used. In theorem, a POS field of 8 bits can be used in implementations of ALE with an ALE block of up to 256 PDUs. In addition, in the stage of the PDU mapping associated with PA_ALE_SAP, the value of a link list field (T tag) or a POS field with respect to a control information PDU (such as DL_CTRL_INFO or PA_CTRL_INFO PDU) may be set to a default value (e.g., 0 or another value) temporarily. The value of the link list field (T tag) or the POS field with respect to the control information PDU is to be determined in the stage of generation of a control block by the PHY_ALE_SAP.

As illustrated above, the DL frames or PACP frames on the sending side, such as a host (or a device), are translated into ALE control blocks or data blocks in the PA layer. The modified M-PHY for the ALE is implemented to transmit the ALE control blocks or data blocks to a receiving side (or called receiver side), such as a device (or a host).

On the receiving side, a modified version of UniPro can be implemented to restore the PDUs of an ALE control block to its former ordering by checking the POS fields of the control symbols of the ALE control block. An embodiment of a process for restoring operations is as follows. First, finding a synchronization header of a control block is performed, wherein the control block has at least one CTRL_INFO PDU. Secondly, a control symbol, e.g., CTRL_INFO PDU, from the first PDU after the synchronization header is extracted. The T tag of the control symbol is then examined. If T=0, extraction of the followed CTRL_INFO PDU on the next PDU is performed. If T=1, extraction of the followed data PDU on the next PDU is performed. Restoring CTRL_INFO PDUs is performed after the examination of the last PDU.

In addition, on the sending side, the ALE control blocks or data blocks are scrambled before being transmitted by the modified M-PHY for DC balance, and on the receiving side, corresponding received data is de-scrambled before the restoring operations. The scrambling or de-scrambling operation can be implemented in the PA layer or physical layer of the interconnection protocol, for example.

In the advanced line encoding scheme, there is no K-Code (control symbols) of 8b/10b coding scheme for the receiver to do symbol alignment and symbol lock operation. In order to resolve symbol alignment and symbol lock issue in the ALE coding scheme, an ALE control block is generated on the transmitter side as illustrated above by reordering control symbols to be transmitted for symbol alignment and symbol lock and the ALE control block can then be restored on the receiver side accordingly.

In an embodiment, the PA service access point for lane alignment for ALE, PA_ALE_LANE_ALIGN, is provided. The service access point PA_ALE_LANE_ALIGN is provided for the DL layer to send a lane alignment pattern in the advanced line encoding mode for the counterpart of a peer side to do block alignment and lock operation. For example, the lane alignment pattern includes an ordered set pattern provided for lane alignment in the ALE mode. As an example, the ordered set pattern has a format as follows: {Preamble bit, {8{8'h00}}, {8{8'hFF}}}+{Preamble bit, {4{8'hB1, {3{8'hC6}}}}}. The first portion of the ordered set pattern, i.e., {Preamble bit, {8{8'h00}}, {8{8'hFF}}}, is a low frequency pattern that alternates between 32 0s and 32 1s and is not involved into scrambling. The PA receiver, for example, is implemented to use the first portion of the ordered set pattern for block alignment. The second portion of the ordered set pattern, i.e., {Preamble bit, {4{8'hB1, {3{8'hC6}}}}}, is a special pattern which is not involved into scrambling. The PA receiver, for example, is implemented to determine whether the second portion of the ordered set pattern is properly received when a criterion with respect to the second portion is satisfied. In an example, where the second portion of the ordered set pattern has N (e.g., N=4) sets of a specific data pattern {8'hB1, {3{8'hC6}}} (i.e., {B1, C6, C6, C6}), a criterion may be made for the PA receiver as to whether there are M (e.g., M<N, such as M=3) or more than M sets of {B1, C6, C6, C6} are detected at the PA receiver. If the PA receiver using this criterion has detected M or more than M sets of {B1, C6, C6, C6}, the PA receiver determine that that the second portion of the ordered set pattern is properly received.

Figure 5:
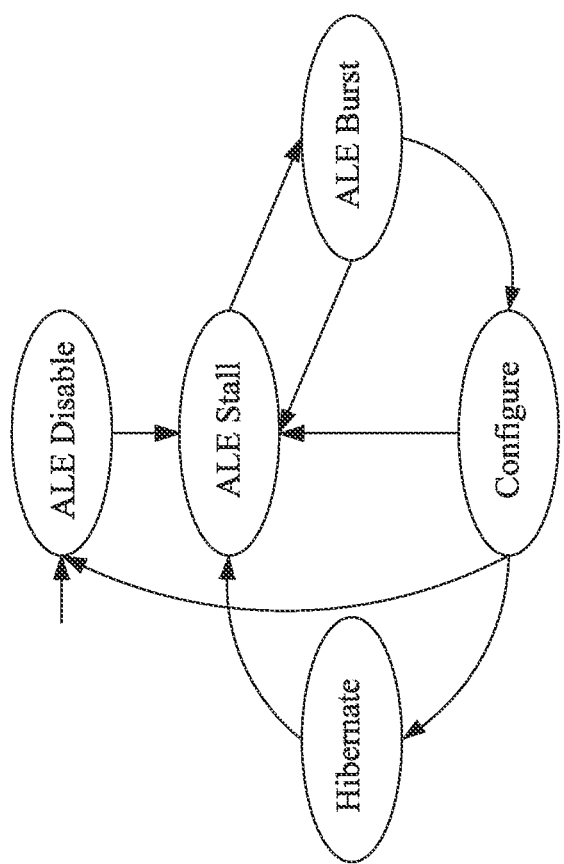
FIG. 5 is a diagram illustrating an example of a finite state machine for a receiving side.

In some embodiments, the PA layer of the interconnection protocol is implemented to operate according to a finite state machine (FSM), denoted by ALE_RX_FSM, for a receiver to support operations in the advanced line encoding mode. FIG. 5 illustrates an example of a finite state machine for a receiving side. The finite state machine ALE_RX_FSM can be implemented based on FIG. 5 and in a PA layer receiver. As shown in FIG. 5, the finite state machine includes a plurality of states (or referred to as ALE RX states) for a receiver to support operations in the advanced line encoding mode, such as ALE Disable, ALE Stall, ALE Burst, Configure, and Hibernate.

TABLE 3 illustrates examples of the ALE RX states for ALE_RX_FSM.

TABLE 3

| ALE RX states | Link width | Link speed | Receiver error |
| --- | --- | --- | --- |
| ALE Disable | High-Speed mode (HS-mode) (8 b/10 b) | HS-mode | HS-mode error |
| ALE Stall | To be set | Transition | No action |
| ALE Burst | No action | ALE mode (128 b/13 × b) | ALE link error |
| Configure | No action | ALE mode | ALE link error |
| Hibernate | Undefined (Not available) | Undefined (Not available) | No action |

In TABLE 3, the ALE RX states include, for example, ALE Disable, ALE Stall, ALE Burst, Configure, and Hibernate. In addition, the ALE RX states have respective link width settings, link speed settings, and receiver operations. Herein, "link width" indicates a bus width of an interface between a module implementing a link layer (such as a modified version of UniPro) of the interconnection protocol and a module implementing a physical layer (such as a modified version of M-PHY) of the interconnection protocol for one of the ALE RX states. "Link speed" indicates the speed of the interface for one of the ALE RX states. "Receiver error" indicates that the receiver responds to which type of errors for one of the ALE RX states.

For example, the ALE Disable state indicates a state which can be a legacy mode, for example, an operating mode such as 8b/10b encoding (or referred to as high-speed mode (HS-mode)) supported by the UniPro (e.g., UniPro version 2.0). For the ALE Disable state, the link width is set for the legacy mode, such as the HS-mode, with its link speed (interface speed) for the legacy mode, and the receiver responds to HS-mode errors. The ALE Stall state indicates a transitional state which can be a transition from the ALE Disable state to the ALE Burst state or vice versa. For the ALE Stall state, the link width is to be set for an ALE mode (e.g., 128b/13xb encoding) or the legacy mode with its link speed (interface speed) for the ALE mode or the legacy mode, and the receiver does not respond to any errors (i.e., no action), where x indicates an integer of 0 to 9. The ALE Burst state indicates a state where an ALE burst transmission (i.e., a burst transmission in an ALE mode) is started or opened. For the ALE Burst state, the link width remains as that set in the ALE Stall state for the ALE mode with its link speed for the ALE mode, and the receiver responds to any errors related to the ALE mode (e.g., the receiver is set to report ALE link error). The Configure state indicates a state to do power mode change operations. For the Configure state, the link width remains (set for the ALE mode) with its link speed (interface speed) for the ALE mode, and the receiver also responds to any errors related to the ALE mode. The Hibernate state indicates a power saving state where at least a portion of modules for implementing the modified version of UniPro and/or the modified version of M-PHY may be turned off or operate in a lower power state. For the Hibernate state, the link width and link speed may be changed or unchanged, depending upon specific implementation for the power saving operations, and thus are described as undefined or not available, and the receiver will not respond to any errors.

In some embodiments, when a PA layer receiver for the interconnection protocol is implemented according to FIG. 5, the PA layer receiver is operable to enter the advanced line encoding mode for data transfer. Data transmission using an advanced line encoding occurs in bursts associated with power saving states between bursts. For example, when the PA layer receiver is configured to operate in the ALE Disable state, the advanced line encoding mode is disabled and the PA layer receiver may be configured in another state or operating mode, such as a High-Speed mode (HS-mode) using 8b/10b coding, specified in the M-PHY specification (e.g., M-PHY version 5.0). When a power mode change requirement for entering the advanced line encoding mode is received from an upper layer or a local or remote device management entity (DME), the PA layer receiver transitions to the ALE Stall state, wherein the power mode change requirement, for example, may be a PA_LM_PWR_MODE_CHANGED.ind primitive being similar to or derived from that described in the UniPro specification. The ALE Stall state is a power saving state in the advanced line encoding mode, in order to enable fast and efficient BURST cycles in the advanced line encoding mode. The ALE Stall state is exited to the ALE Burst state due to a burst start event, such as a burst rising signaling or burst start pattern received at the PA layer receiver. In other words, the ALE Burst state is entered when the PA layer receiver receives the burst rising event from the sending side. Entering the ALE Stall state can occur from the ALE Disable, ALE Burst, Configure, or Hiberate state. For example, the ALE Burst state is exited to the ALE Stall state due to a burst end event, such as a burst failing signaling or burst end pattern received at the PA layer receiver. In addition, the ALE Burst state is exited to the Configure state due to a power mode change request and confirmation thereof. For example, the PA layer receiver enters the Configure state after the PA layer receiver receives a DME_POWERMODE.req primitive and confirms this primitive with a DME_POWERMODE.cnf_L primitive, wherein the DME_POWERMODE.req and DME_POWERMODE.cnf_L primitives can be derived from those specified in the UniPro specification. The Configure state is exited to the ALE Stall state when an indicator for entering the ALE Stall state is received. Further, the Configure state is exited to the Hibernate state when an indicator for entering the Hibernate state is received, or to the ALE Disable state when a reset request for the UniPro stack from an upper layer is received. The Hibernate state is a power saving state where power consumption is lower than that in the ALE Stall state and configuration associated with the interconnection protocol is retained. The Hibernate state is exited to the ALE Stall state when an indicator for exiting the Hibernate state is received.

Further, in some embodiments, the PA layer of the interconnection protocol is implemented to report errors to the data link layer, wherein errors are probably associated with data transmission using the advanced line encoding and can be detected or identified by the PA layer. In an embodiment of the service access point PA_SAP, a status primitive for reporting errors, such as a PA_ERROR.ind primitive, can be used for this purpose, wherein the status primitive can be similar to or derived from that described in the UniPro specification. The semantics of the status primitive are: PA_ERROR.ind(PAErrorCode), wherein a PAErrorCode parameter identifies a detected error as exemplified in TABLE 4.

TABLE 4 illustrates examples of the PA_SAP status primitive parameters. In TABLE 4, a value of the PAErrorCode parameter, denoted by BAD_ALE_BLOCK, for indicating errors associated with ALE control blocks or ALE data blocks is added.

TABLE 4

| Name | Type | Valid range | Value | Description |
| --- | --- | --- | --- | --- |
| PAErrorCode | Enumeration | BAD_PHY_SYMBOL<br>UNMAPPED_PHY_ESC_SYMBOL<br>UNEXPECTED_PHY_ESC_SYMBOL<br>BAD_PA_PARAM<br>BAD_ALE_BLOCK | 1<br>2<br>3<br>4<br>5 | Error types as identified by the PA Layer and flagged to the data link layer. |

In some embodiments in the advanced line encoding mode, the PA_ERROR.ind primitive is sent when an ALE control block or ALE data block has an error that the PA Layer can detect. The DL Layer of the interconnection protocol can be implemented to perform error handling operations on receipt of the PA_ERROR.ind primitive indicating the error.

In the present disclosure, error handling operations for data link frame re-transmission (or replay) in the advanced line encoding mode are concerned in order to facilitate implementation of the advanced line encoding mode. Various embodiments for facilitating implementation of error handling in the advanced line encoding mode are provided below.

Figure 6:
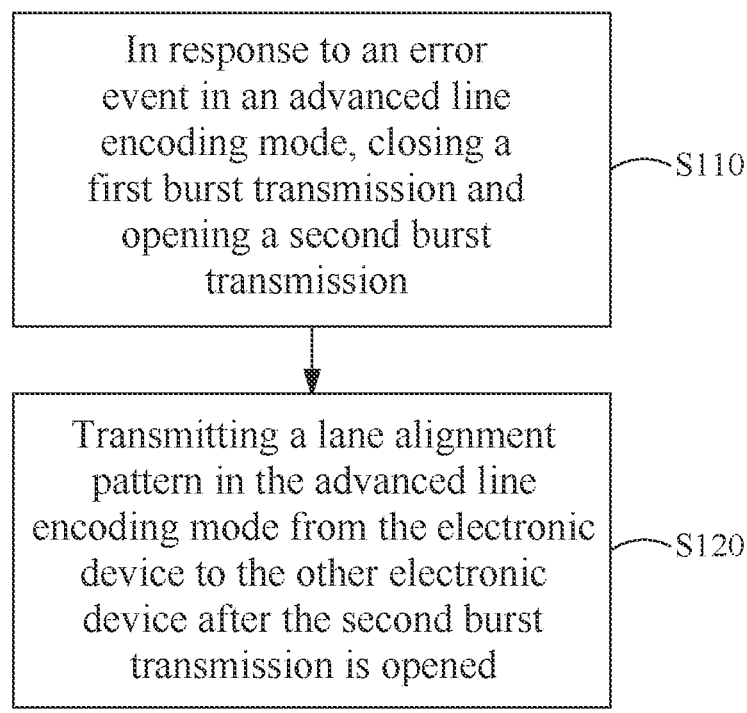
FIG. 6 is a flowchart illustrating an embodiment of a method for facilitating error handling.

FIG. 6 illustrates an embodiment of a method for facilitating error handling. The method can be implemented in an electronic device capable of communicating with another electronic device according to the interconnection protocol, wherein the electronic device and the other electronic device may be a local host and remote device respectively, or vice versa. As illustrated in FIG. 6, the method includes operations S110 and S120.

In the operation S110, in response to an error event in an advanced line encoding mode, closing a first burst transmission and opening a second burst transmission are performed. The error event may be an error in an ALE control block or ALE data block, which the PA Layer can detect, or an error in a frame that the DL layer or PA layer can detect. The advanced line encoding mode indicates that the electronic device is capable of data transmission by using an advanced line encoding having an improved effective data rate as compared to 8b/10b encoding. The operation S110 is performed, for example, by the physical layer (such as a modified version of M-PHY) of the interconnection protocol to re-align blocks from the new burst transmission, i.e., the second burst transmission.

In the operation S120, a lane alignment pattern in the advanced line encoding mode is transmitted from the electronic device to the other electronic device after the second burst transmission is opened. The operation S120 is used, for example, by the link layer (such as a modified version of UniPro) of the interconnection protocol to re-align blocks for coming re-transmission messages (such as DL or PACP frames). For example, the link layer can apply the service access point PA_ALE_LANE_ALIGN as exemplified above to send a lane alignment pattern in the advanced line encoding mode for the counterpart of a peer side to do block alignment and lock operation.

The method of FIG. 6 can be applied in a process of error handling in the advanced line encoding mode. For example, whenever an electronic device communicating with another electronic device according to the interconnection protocol identifies an error event such as an error in an ALE control block or ALE data block, or an expiration of a frame replay timer or protection timer, the electronic device can apply the method of FIG. 6 proactively and then perform one or more subsequent operations such as transmitting an NAC frame, re-transmitting a frame, or sending one or more associated primitives to the other electronic device for error handling. In the advanced line encoding mode, the operation S110 can ensure bit-level relock and re-alignment on one hand while the operation S120 can ensure block-level relock and re-alignment on the other hand. As a whole, the method of FIG. 6 can be applied in the electronic device to enhance reliability of the link in the advanced line encoding mode when an error event is detected and before one or more subsequent operation(s) that the electronic device is to perform in response to the error event. In addition, the method of FIG. 6 can ensure that the counterpart or peer side can be informed of the error event or can be triggered to perform appropriate operations for error handling in the advanced line encoding mode effectively and efficiently.

Moreover, in the advanced line encoding mode, 8b/10b coding in M-PHY is not used and the physical layer of the interconnection protocol with ALE may be implemented to perform bits transmission using a specific signaling scheme. In some embodiment, an electronic device may be implemented according to the interconnection protocol with an advanced line encoding scheme, such as 128b/129b, 128b/130b, or 128b/132b, or so on, in conjunction with a signaling scheme, such as PAM-n (e.g., PAM-4) or so on, to enhance overall effective data rates. In these embodiments, the link of the electronic device in the advanced line encoding mode may have a bit error rate higher than that of the 8b/10b coding scheme in conjunction with a NRZ signaling. In this case, the method of FIG. 6 can ensure that the counterpart or peer side can be informed of the error event or can be triggered to perform appropriate operations for error handling in the advanced line encoding mode effectively and efficiently. In contrast, if the electronic device, in response to an error event, performs one or more subsequent operation(s), such as sending a NAC frame or primitive, without using the method of FIG. 6, the peer side (or another electronic device) may not receive the NAC frame or primitive properly in worse cases, causing spending more time on re-transmission and malfunction of the electronic device.

Figure 7:
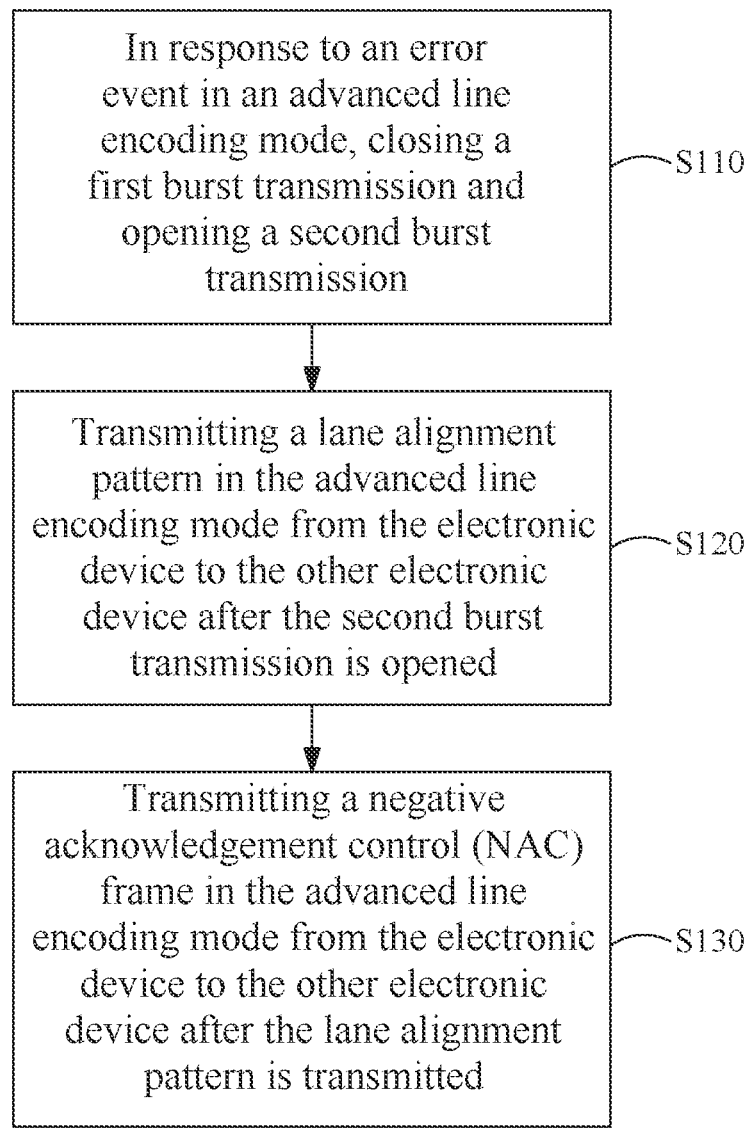
FIG. 7 is a flowchart illustrating another embodiment of a method for facilitating error handling, on the basis of FIG. 6.

FIG. 7 illustrates another embodiment of a process for facilitating error handling on the basis of FIG. 6. As illustrated in FIG. 7, the process further includes operation S130 in addition to the operations S110 and S120.

In the operation S130, a negative acknowledgement control (NAC) frame in the advanced line encoding mode is transmitted from the electronic device to the other electronic device after the lane alignment pattern is transmitted.

In the method of FIG. 7, in response to an error event associated with a data frame, ALE data block or ALE control block, in the advanced line encoding mode, the electronic device is capable of proactively performing the method of FIG. 6 to ensure that another electronic device (i.e., a counterpart or a peer side) receives the NAC frame. The NAC frame, for example, is used for requesting frame re-transmission. In another example, the NAC may indicates that an error event occurs and frame re-transmission is to be followed.

Figure 8:
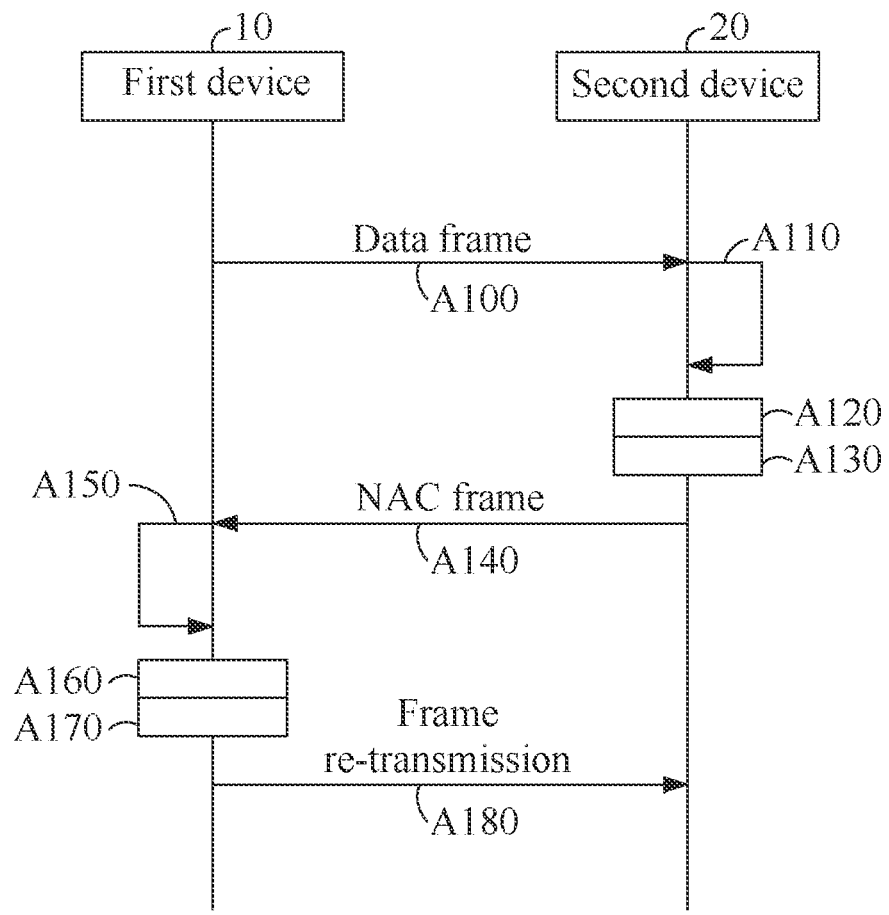
FIG. 8 is a diagram illustrating an embodiment of a process of error handling in an advanced line encoding mode, on the basis of the method of FIG. 6 or 7.

FIG. 8 illustrates an embodiment of a process of error handling in an advanced line encoding mode, on the basis of the method of FIG. 6 or 7. As illustrated in FIG. 8, a first device 10 (e.g., an electronic device) communicates with a second device 20 (e.g., another electronic device) according to the interconnection protocol, wherein the first device 10 and second device 20 may be a local host and remote device respectively, or vice versa. It is assumed that a burst transmission from the first device 10 to the second device 20, or called a first burst transmission for the first device 10, and a burst transmission from the second device 20 to the first device 10, or called a first burst transmission for the second device 20, are started (or opened) in an advanced line encoding mode. In operation A100, the first device 10 sends a data frame to the second device 20 by communication using the advanced line encoding. In operation A110, the second device 20 receives data associated with the data frame and detects an error such as a CRC error or frame sequence number error in the received data, wherein this error is an error event and error handling operations are to be performed. In response to the error event, the second device 20 closes the burst transmission (or the first burst transmission for the second device 20) and opens a new burst transmission (or called a second burst transmission for the second device 20) in the advanced line encoding mode, in operation A120. In operation A130, a lane alignment pattern in the advanced line encoding mode is transmitted from the second device 20 to the first device 10 after the new burst transmission is opened. In operation A140, a negative acknowledgement control (NAC) frame in the advanced line encoding mode is transmitted from the second device 20 to the first device 10 after the transmission of the lane alignment pattern. The NAC frame is used for requesting the counterpart (i.e., the first device 10) to do re-transmission (or replay operation) for a data frame associated with the error event. In operation A150, the first device 10 receives the NAC frame and then prepares for making a re-transmission. For preparation of the re-transmission due to the error event, in operation A160, the first device 10 closes the current burst transmission (or the first burst transmission for the first device 10) and opens a new burst transmission (or called a second burst transmission for the first device 10) in the advanced line encoding mode. In operation A170, a lane alignment pattern in the advanced line encoding mode is transmitted from the first device 10 to the second device 20 after the new burst transmission (or the second burst transmission for the first device 10) is opened. In operation A180, the first device 10 re-transmits the data frame associated with the error event to the second device 20 by communication using the advanced line encoding after the transmission of the lane alignment pattern.

In FIG. 8, the operations A120 and A130, or the operations A160 and A170, are based on the method of FIG. 6. In addition, the operations A120, A130, and A140 can be regarded as an application of the method of FIG. 7 into the process of FIG. 8. Further, in some embodiments, one or more methods for facilitating error handling can be obtained or further derived from the process of FIG. 8. For example, a method for facilitating error handling is provided with respect to the first device 10 includes the operations A150 to A180.

The process of error handling illustrated in FIG. 8 can be regarded as a simplified process representing a variety of processes for error handling that may be encountered in practical scenarios. Regarding this, two examples are illustrated below for scenarios involving re-transmission due to an NAC frame.

Figure 9:
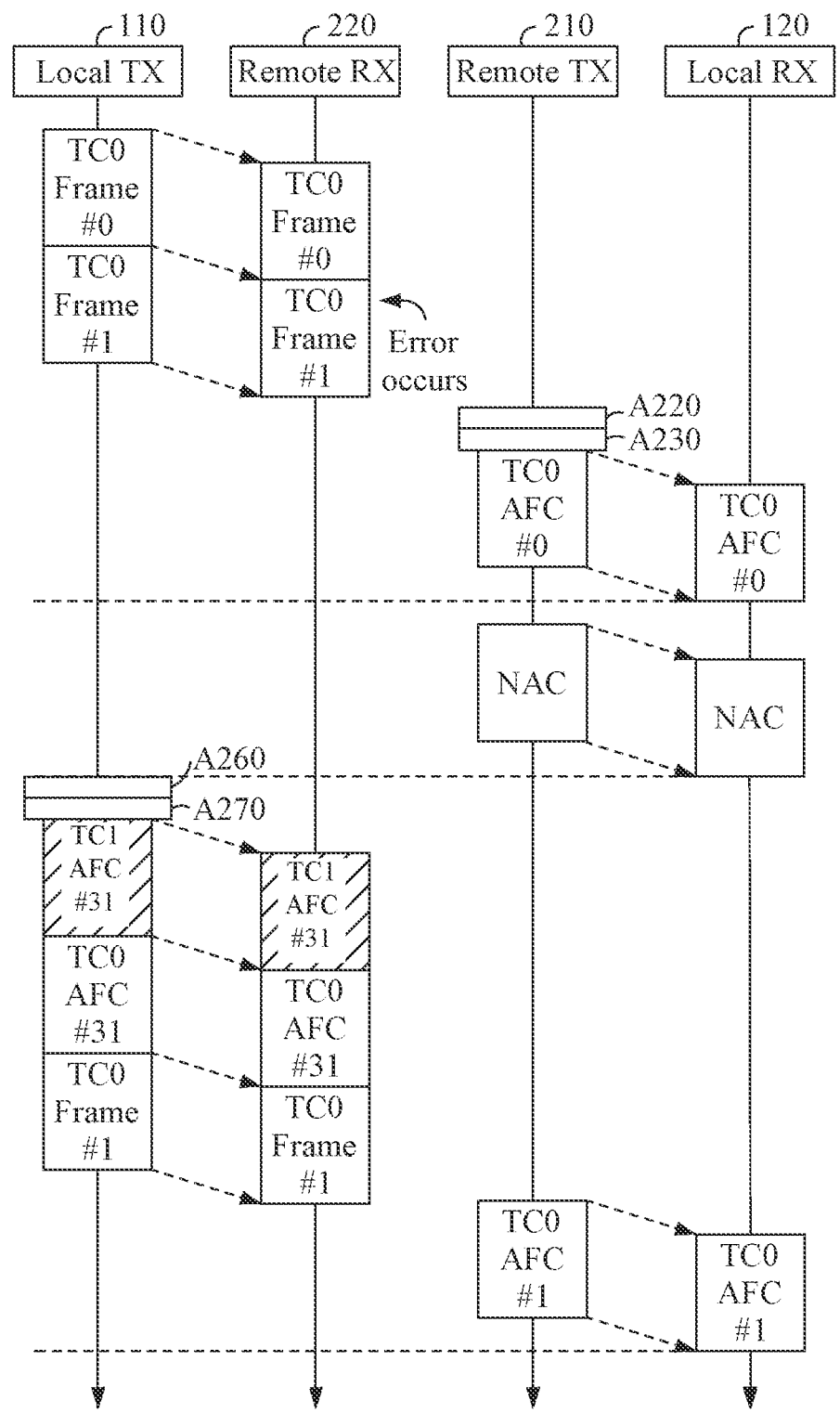
FIG. 9 is a diagram illustrating an example of a process involving re-transmission due to an NAC frame in an advanced line encoding mode.
Figure 10:
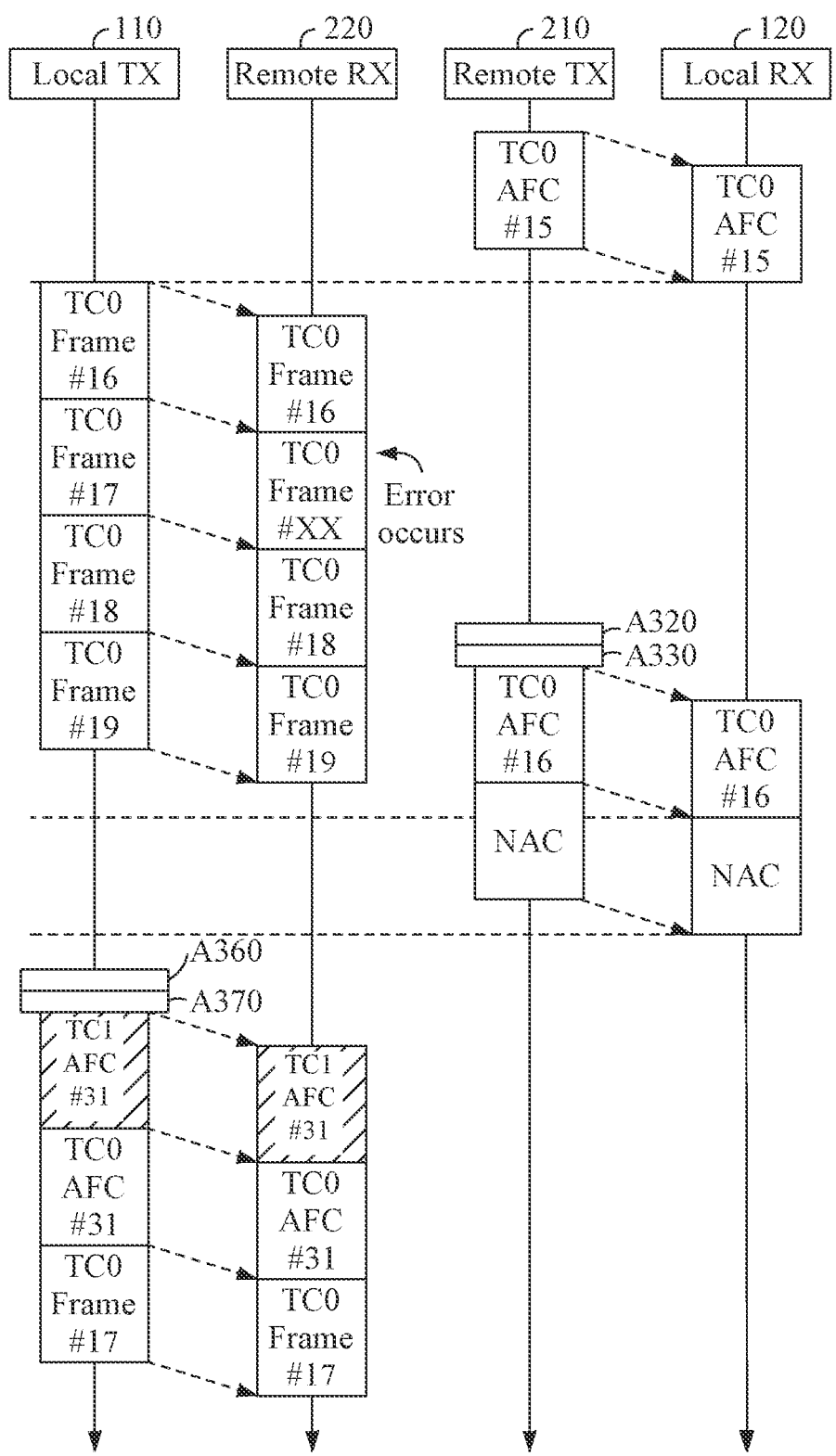
FIG. 10 is a diagram illustrating an example of a process involving re-transmission due to wrong sequence number of frames in an advanced line encoding mode.

FIG. 9 illustrates an example of a process involving re-transmission due to an NAC frame in an advanced line encoding mode. Before discussion of FIG. 9, some assumptions are mentioned as follows. In FIG. 9 or similar Figures such as FIG. 10 and so on, a local transmitter (TX) 110 and a local receiver (RX) 120 are shown, which can be regarded as modules in the first device 10 in FIG. 8 while a remote transmitter (TX) 210 and a remote receiver (RX) 220 are shown, which can be regarded as modules in the second device 20 in FIG. 8. In addition, a frame is represented in FIG. 8 or similar Figure by using a rectangle with a legend. For example, a data frame is represented with a legend "TC0 Frame #0" where TC stands for traffic class and "#0" represents its frame sequence number of the data frame being a value of "0", and SOF, EOF, and CRC of the data frame will not be shown in the rectangle for the sake of brevity. In addition, TC0 and TC1 Frames are depicted respectively in white and gray color. In another example, an AFC frame associated with a data frame with the legend "TC0 Frame #0" is represented by a rectangle with a legend "TC0 AFC #0", where the AFC frame may be referred to as a "AFC0 #0" frame and CRC of the AFC frame will not be shown in the rectangle for the sake of brevity. The other frames in FIG. 9 or similar Figures can be represented with respective legends in a similar manner. The transmission and reception of the frames by the modules are represented in FIG. 9 or similar Figures along with time. Further, according to the UniPro specification (e.g., UniPro version 2.0), a dedicated replay timer (TCx_REPLAY_TIMER) is provided for each Traffic Class (TC0 and TC1) to identify unacknowledged transmitted frames, where x is 0 for TC0, or 1 for TC1. For the sake of brevity, a frame will be shown with a replay timer in a Figure only in a situation where the replay timer expires; otherwise, the replay timer will be shown if necessary. In FIG. 9 or FIG. 10, the replay timer is not shown because no expiration of the replay timer occurs.

FIG. 9 illustrates re-transmission triggered by a NAC frame. In FIG. 9, the remote agent (e.g., the second device 20 or remote RX 220) detects certain error and starts sending a NAC Frame for requesting a counterpart (e.g., the first device 10 or local TX 110) to do replay operation. Before the NAC frame is transmitted, one or more AFC frames may be transmitted. As compared to the conventional process specified in the UniPro specification, new added features are that the remote agent closes an ALE burst first and opens a new ALE burst, as indicated by operation A220 (or operation A260), and then insert a lane alignment pattern using PA_ALE_LANE_ALIGN, as indicated by operation A230 (or operation A270). After the NAC frame has been sent, NAC transmission shall be disabled until the DL Layer receives one data or control (e.g., AFC or NAC) frame without any error.

The scenario of re-transmission due to a NAC frame in FIG. 9 is described more specifically as follows. Initially, it is assumed that an ALE burst from the local TX 110 to the remote RX 220 and an ALE burst from the remote TX 210 to the local RX 120 are established in an advanced line encoding mode. The local TX 110 sends TC0 Frame #0 and Frame #1. A replay timer, e.g., TC0_REPLAY_TIMER as specified in the UniPro specification, is reset and started after sending the last symbol of Frame #1. The Forward Link carries no traffic from the local TX 110 after sending TC0 Frame #1. The peer RX (e.g., remote RX 220) receives Frame #0 in good condition, and Frame #1 with an error (e.g., detected during CRC checking). The remote RX 220 discards the last Frame, i.e. Frame #1, and schedules an AFC Frame to acknowledge TC0 Frame #0, and a NAC Frame with the RReq bit set to '0', which acknowledges correct reception of TC0 Frame #0. Before sending the AFC or NAC frame, the second device 20 (e.g., remote TX 210) performs the operations A220 and A230 according to the operation A120 and A130 as illustrated in FIG. 8. After reception of the AFC0 Frame by the local RX, the local RX 120 resets and starts the TC0_REPLAY_TIMER. After reception of the NAC Frame by the local RX 120, the local RX 120 resets and freezes the TC0_REPLAY_TIMER, transmits AFC Frames for TC1 and TC0 and retransmits TC0 Frame #1. Before sending the AFC frames and retransmitting the TC0 Frame #1, the first device 10 (e.g., the local TX 110) performs the operations A260 and A270 according to the operation A160 and A170 as illustrated in FIG. 8. After retransmitting TC0 Frame #1 it resets and starts TC0_REPLAY_TIMER. Peer RX (i.e., the remote RX 220) receives TC0 Frame #1 in good condition this time, and sends an acknowledgment for the Frame with AFC0 #1 Frame. The local RX detects AFC0 #1 Frame and stops the TC0_REPLAY_TIMER as there are no pending acknowledgments.

FIG. 10 illustrates an example of a process involving re-transmission due to wrong sequence number of frames in an advanced line encoding mode. In FIG. 10, re-transmission is triggered by incorrect frame sequence number. The remote agent (e.g., the second device 20 or the remote RX 220) detects a sequence number error and start doing NAC Frame transmission to request a counterpart (e.g., the first device 10 or the local TX 110) to do replay operation. Before the NAC frame is transmitted, one or more AFC frames may be transmitted. As compared to the conventional process specified in the UniPro specification, new added features in the process of FIG. 10 are that the remote agent closes an ALE burst (i.e., a burst transmission in the advanced line encoding mode) first and opens a new ALE burst, as indicated by operation A320 (or operation A360), and then inserts a PA_ALE_LANE_ALIGN primitive, as indicated by operation A330 (or operation A370). After the NAC frame has been sent, NAC transmission is disabled until the DL Layer receives one data or control (e.g., AFC or NAC) frame without any error.

The scenario of re-transmission due to a wrong Frame Sequence Number in FIG. 10 is described more specifically as follows. Initially, it is assumed that an ALE burst from the local TX 110 to the remote RX 220 and an ALE burst from the remote TX 210 to the local RX 120 are established in an advanced line encoding mode. The local TX 110 transmits TC0 Data Frames starting from Frame #16. An acknowledgment (e.g., an AFC frame "TC0 AFC #15") is received for all Frames up to Frame #15 (sending of these Frames are not shown in the figure) that stops TC0_REPLAY_TIMER before Frame #16 is transmitted. The peer RX (e.g., remote RX 220) detects Frame #16 and Frame #18 but does not detect Frame #17 (e.g., SOF and/or EOF of Frame #17 not detected). The remote RX 220 recognizes the wrong Frame Sequence Number when the remote RX 220 receives Frame #18 (while Frame #17 is expected). The peer RX (e.g., remote RX 220) discards all TC0 Data Frames from Frame #18 until the remote RX 220 receives TC0 Frame #17. The peer TX (e.g., remote TX 210) sends an AFC0 #16 Frame and a NAC Frame with the RReq bit set to '0'. Before sending the AFC and NAC frames, the second device 20 (e.g., remote TX 210) performs the operations A320 and A330 according to the operation A120 and A130 as illustrated in FIG. 8. The local RX 120 receives the AFC0 #16 and the NAC Frame and the local TX 110 transmits AFC Frames for TC1 and TC0 then starts retransmission of TC0 Frame #17 and the Frames that follow it (not shown in the figure). Before sending the AFC frames and retransmitting the TC0 Frame #17, the first device 10 (e.g., the local TX 110) performs the operations A360 and A370 according to the operation A160 and A170 as illustrated in FIG. 8.

Figure 11:
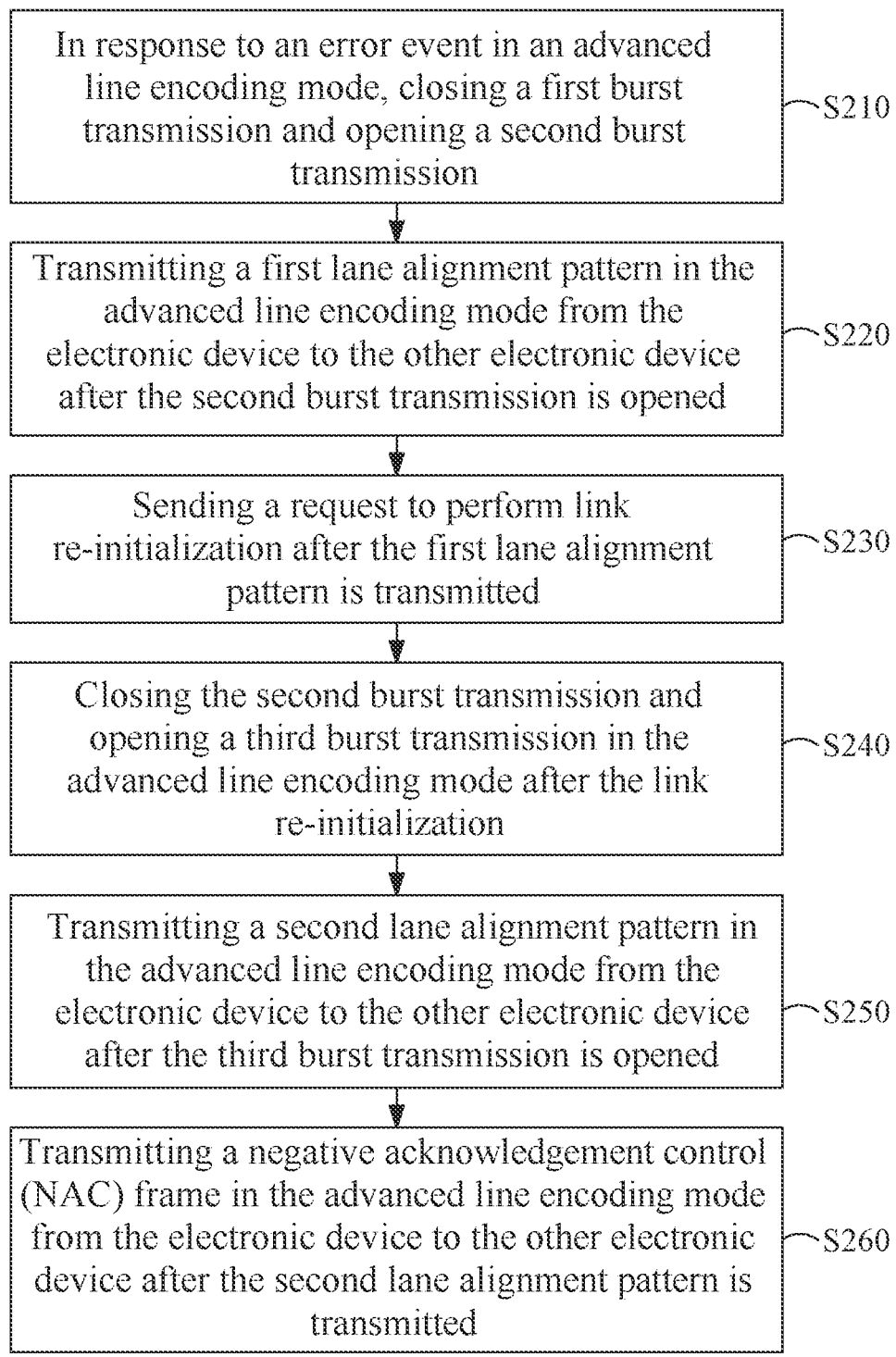
FIG. 11 is a flowchart illustrating another embodiment of a method for facilitating error handling, on the basis of FIG. 6.

FIG. 11 is a flowchart illustrating another embodiment of a method for facilitating error handling, on the basis of FIG. 6. As illustrated in FIG. 11, the method includes operations S210 to S260.

In the operation S210, in response to an error event in an advanced line encoding mode, closing a first burst transmission and opening a second burst transmission are performed. The error event may indicate that the electronic device does not receive an acknowledgment in the advanced line encoding mode within a time interval after transmitting a frame (e.g., a timer for the frame expires), wherein the frame is an unacknowledged transmitted frame. The operation S210 can be regarded as an example of the operation S110.

In the operation S220, a first lane alignment pattern in the advanced line encoding mode is transmitted from the electronic device to the other electronic device after the second burst transmission is opened. The operation S220 can be regarded as an example of the operation S120.

In the operation S230, a request to perform link re-initialization is sent after the second burst transmission is opened. For example, in the electronic device, the DL layer of the interconnection protocol sends a PA_INIT.req primitive to request to (re-)initialize the PA layer and underlying physical layer of the interconnection protocol. According to the UniPro specification (e.g., version 2.0), the PA_INIT.req primitive can trigger a link re-initialization procedure, in which the PA Layer (re-)initializes its transmit path and further performs actions to (re-)initialize the underlying PHY transmit path. In addition, in the case of M-PHY, the PA Layer and PHY receive paths are also (re-)initialized. Further, after the re-initialization procedure is completed, the PA layer generates a PA_INIT.cnf_L primitive to inform the DL layer of the completion of the re-initialization procedure. In this manner, the interconnection protocol with the ALE can be derived from the link re-initialization procedure accordingly. In the method of FIG. 11, when the link re-initialization is performed successfully, the subsequent operations of the method are then performed.

In the operation S240, the second burst transmission is closed and a third burst transmission is opened in the advanced line encoding mode after the link re-initialization is performed. The operation S240 can be regarded as an example of the operation S110.

In the operation S250, a second lane alignment pattern in the advanced line encoding mode is transmitted from the electronic device to the other electronic device after the third burst transmission is opened. The operation S250 can be regarded as an example of the operation S120. In some embodiments, the method of FIG. 11 can be implemented to utilize the second lane alignment pattern transmitted in the operation S250 as same as, similar to, or different from the first lane alignment pattern transmitted in the operation S220. In an example for the method of FIG. 11, the second lane alignment pattern is equal to the first lane alignment pattern, for the sake of simplicity.

In the operation S260, a NAC frame is transmitted after the second lane alignment pattern is transmitted.

The electronic device can be implemented for requesting frame re-transmission in response to an error event by applying the method of FIG. 11 to ensure that in the advanced line encoding mode, another electronic device (i.e., a counterpart or a peer side) can receive the NAC frame. In particular, when the error event indicates that a timer for a frame transmitted expires, the link becomes unreliable and the method can enhance reliability of sending the NAC frame and the subsequent operation(s) for frame re-transmission.

Figure 12:
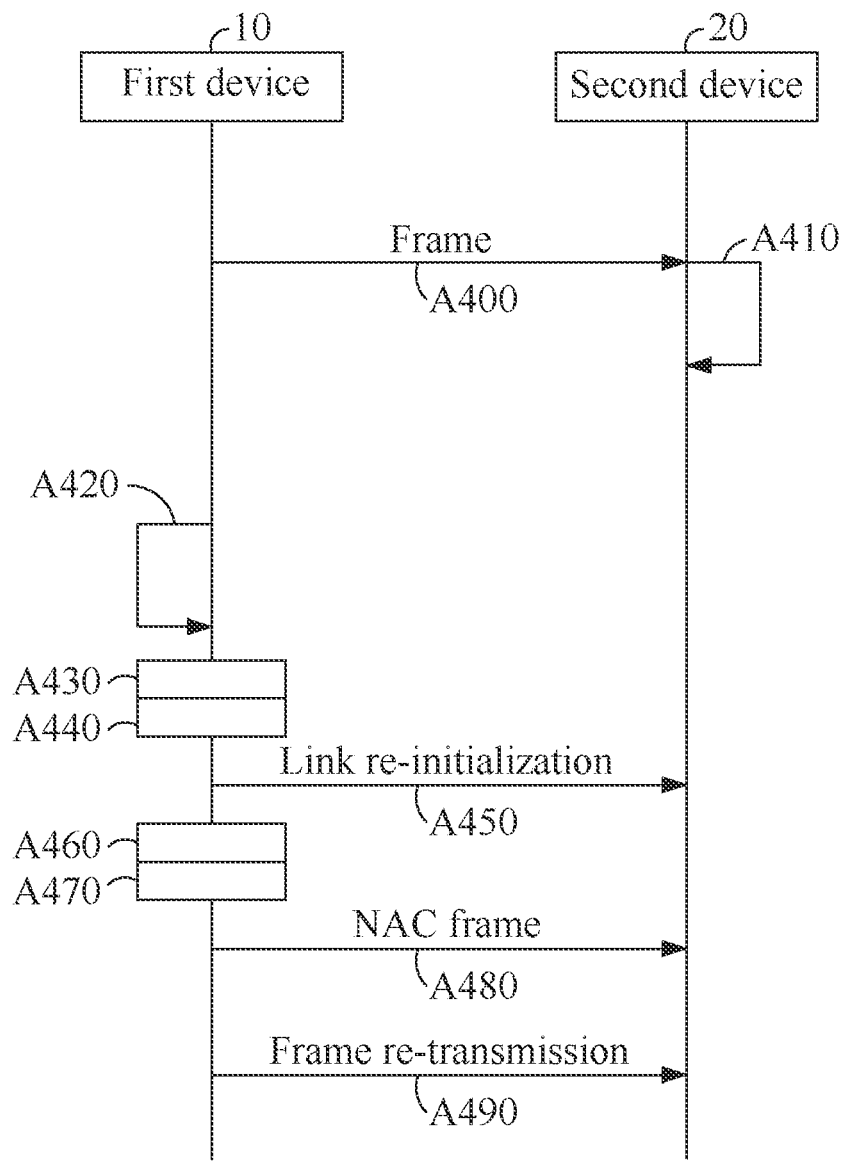
FIG. 12 is a diagram illustrating an embodiment of a process of error handling in an advanced line encoding mode, on the basis of the method of FIG. 6 or 11.

FIG. 12 illustrates an embodiment of a process of error handling in an advanced line encoding mode, on the basis of the method of FIG. 6 or 11. As illustrated in FIG. 12, a first device 10 (e.g., an electronic device) communicates with a second device 20 (e.g., another electronic device) according to the interconnection protocol, wherein the first device 10 and second device 20 may be a local host and remote device respectively, or vice versa. It is assumed that a burst transmission from the first device 10 to the second device 20, or called a first burst transmission for the first device 10, and a burst transmission from the second device 20 to the first device 10, or called a first burst transmission for the second device 20, are started (or opened) in an advanced line encoding mode. In operation A400, the first device 10 sends a frame to the second device 20 by communication using the advanced line encoding, wherein a timer for the frame is reset and running in the first device 10 when the frame is sent and the frame may be a data frame or a control frame such as an AFC frame. In operation A410, the second device 20 receives data associated with a frame, but cannot detect a frame properly according to the data because of, for example, end of frame (EOF) being not detected; or the second device 20 being not ready to receive data. As illustrated in operation A420, the timer for the frame finally times out (or expires), wherein the expiration of the timer can be regarded as an error event and the frame is an unacknowledged transmitted frame.

For ensuring that the link is reliable for data transmission, in operation A430, the first device 10 closes the burst transmission (or the first burst transmission for the first device 10) and opens a new burst transmission (or called a second burst transmission for the first device 10) in the advanced line encoding mode. In operation A440, a first lane alignment pattern in the advanced line encoding mode is transmitted from the first device 10 to the second device 20 after the new burst transmission is opened. In the operation A450, a request to perform link re-initialization is then sent after the second burst transmission is opened.

For preparation of the re-transmission due to the error event, in operation A460, the first device 10 closes the current burst transmission (or the second burst transmission for the first device 10) and opens a new burst transmission (or called a third burst transmission for the first device 10) in the advanced line encoding mode. In operation A470, a second lane alignment pattern in the advanced line encoding mode is transmitted from the first device 10 to the second device 20 after the new burst transmission (or the third burst transmission for the first device 10) is opened. In operation A480, a negative acknowledgement control (NAC) frame in the advanced line encoding mode is transmitted from the first device 10 to the second device 20 after the transmission of the second lane alignment pattern. For example, the second lane alignment pattern may be the same as or different from the first lane alignment pattern. In operation A490, the first device 10 re-transmits the frame associated with the error event (e.g., the expiration of the timer for the unacknowledged transmitted frame) to the second device 20 by communication using the advanced line encoding after the transmission of the second lane alignment pattern.

In FIG. 12, the operations A430 and A440, or the operations A460 and A470, are based on the method of FIG. 6. In addition, the operations A430 to A480 can be regarded as an application of the method of FIG. 11 into the process of FIG. 12. Further, in some embodiments, one or more methods for facilitating error handling can be obtained or further derived from the process of FIG. 12. For example, a method for facilitating error handling is provided with respect to the second device 20 and includes the operations of the counterpart (i.e. second device 20) associated with the operations A430 to A490.

The process of error handling illustrated in FIG. 12 can be regarded as a simplified process representing a variety of processes for error handling that may be encountered in practical scenarios. Regarding this, two examples are illustrated below for scenarios involving re-transmission due to expiration of a timer for an unacknowledged transmitted frame.

Figure 13:
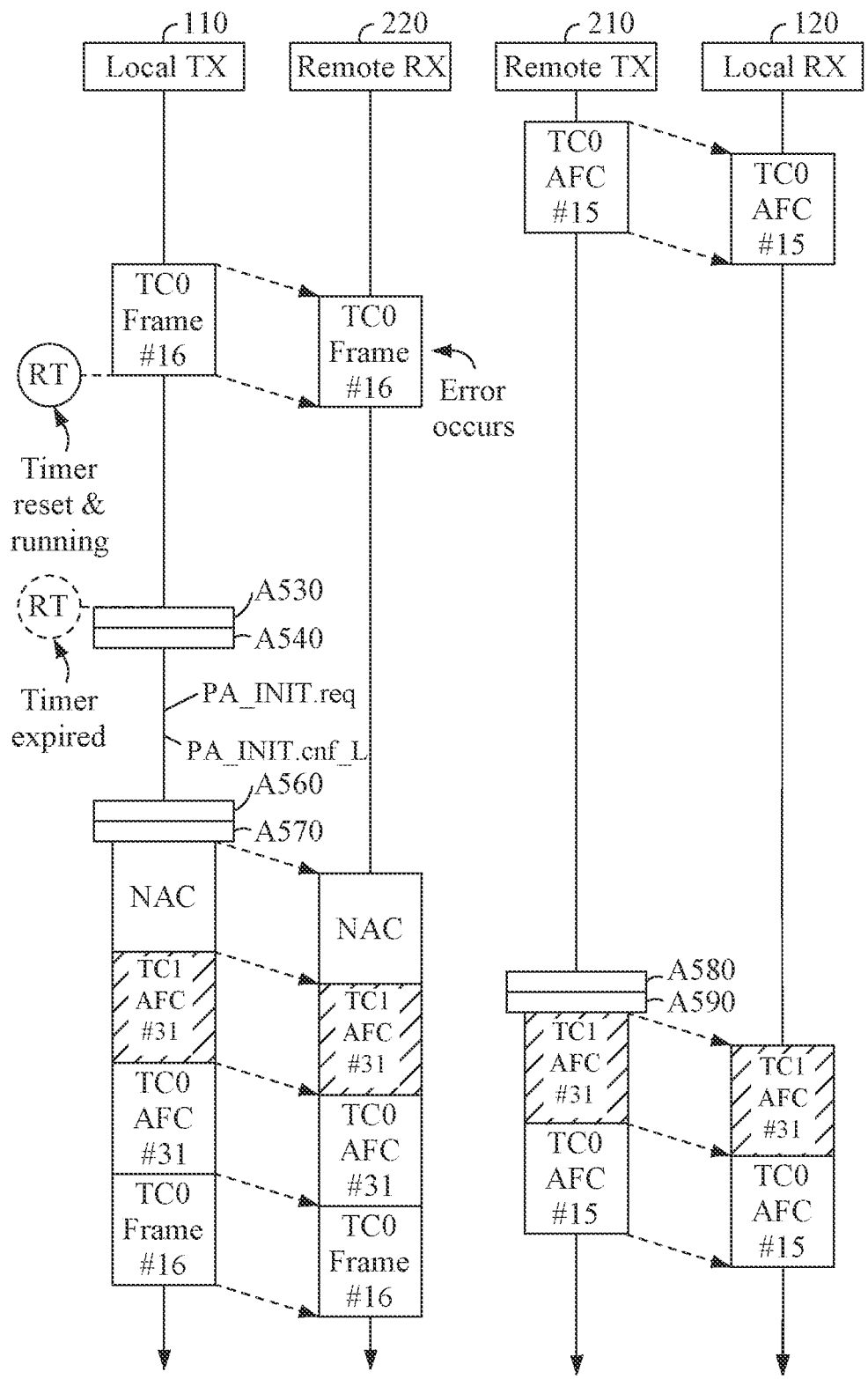
FIG. 13 is a diagram illustrating an example of a process involving re-transmission triggered by expiration of a replay timer in an advanced line encoding mode.

FIG. 13 illustrates an example of a process involving re-transmission triggered by expiration (or timeout) of a replay timer in an advanced line encoding mode. In FIG. 13, expiration of a replay timer RT triggers frame re-transmission, wherein the replay timer RT, for examples, TCx_RE-PLAY_TIMER as exemplified in the UniPro specification, is represented by a circle with a legend of RT. The PA_INIT.req primitive is to be triggered for requesting link re-initialization if the replay timer (TCx_REPLAY_TIMER) expires. As shown in FIG. 13, before triggering the PA_INIT.req primitive (or performing subsequent operations), the local TX 110 closes a current ALE burst and opens a new ALE burst, as indicated by operation A530 (or operation A560), and sends a lane alignment pattern using PA_ALE_LANE_ALIGN, as indicated by operation A540 (or operation A570). If a link re-initialization procedure corresponding to the PA_INIT.req primitive is successful, then a NAC frame is sent, and the Data Link Layer continues operations. If the counterpart (e.g., the second device 20 or remote RX 220) receives the NAC Frame correctly, the counterpart performs operations adhering to the process as illustrated in FIG. 9. That is, before performing one or more subsequent operations with respect to the local side (e.g., the first device 10 or local RX 120), the counterpart (e.g., the second device 20 or remote TX 210) closes a current ALE burst and opens a new ALE burst, as indicated by operation A580, and then performs a PA_ALE_LANE_ALIGN transmission, as indicated by operation A590, to send a lane alignment pattern. Then, the first device 10 or local TX 110 performs replay operation for TC0 frame #16.

The scenario of re-transmission triggered by expiration of TC0_REPLAY_TIMER in FIG. 13 is described more specifically as follows. Initially, it is assumed that an ALE burst from the local TX 110 to the remote RX 220, or called a first burst transmission for the first device 10, and an ALE burst from the remote TX 210 to the local RX 120, or called a first burst transmission for the second device 20, are established in an advanced line encoding mode. As shown in FIG. 13, an acknowledgment (e.g., an AFC frame "TC0 AFC #15") is received for all Frames up to Frame #15 (sending of these Frames are not shown in the figure). After sending TC0 frame #16, the local TX 110 resets a replay timer RT for Traffic Class 0 (TC0_REPLAY_TIMER) and starts waiting for an AFC0 Frame from peer TX. The peer RX (e.g., remote RX 220) cannot detect an EOF_EVEN or EOF_ODD symbol and CRC symbol, so it does not send an AFC0 Frame. The TC0_REPLAY_TIMER at the local TX 110 expires accordingly, wherein the replay timer that has expired is shown with a dashed circle. Because of the expiration of the TC0_REPLAY_TIMER, the local TX 110 is to trigger link re-initialization. Before triggering the PA_INIT.req primitive, the local TX 110 closes the current ALE burst, or the first burst transmission for the first device 10, and opens a new ALE burst, or called a second burst transmission for the first device 10, as indicated by operation A530, and sends a lane alignment pattern using PA_ALE_LANE_ALIGN, as indicated by operation A540, so as to ensure that the link is reliable for data transmission. The local TX 110 then sends the PA_INIT.req primitive to request for link re-initialization. After reception of PA_INIT.cnf_L indicating that a successful initialization procedure is completed, the local TX 110 is to transmit a NAC Frame with the RReq bit set to '0'. Before transmitting a NAC frame, the local TX 110 closes the current ALE burst, or the second burst transmission for the first device 10, and opens a new ALE burst, or called a third burst transmission for the first device 10, as indicated by operation A560, and sends a lane alignment pattern using PA_ALE_LANE_ALIGN, as indicated by operation A570, so as to ensure that the link is reliable for data transmission. After that, the local TX 110 starts transmission first with the AFC Frames for TC1 and TC0 and then retransmits TC0 Frame #16 as there are no unacknowledged TC1 Data Frames. On the other hand, before the peer TX (e.g., remote TX 210) transmits AFC Frames for TC1 and TC0, the remote TX 210 closes the current ALE burst, or the first burst transmission for the second device 20, and opens a new ALE burst, or called a second burst transmission for the second device 20, as indicated by operation A580, and sends a lane alignment pattern using PA_ALE_LA-NE_ALIGN, as indicated by operation A590. The peer TX has no unacknowledged Data Frames for TC1 and TC0 to send. The peer RX (e.g., remote RX 220) receives Frame #16.

Figure 14:
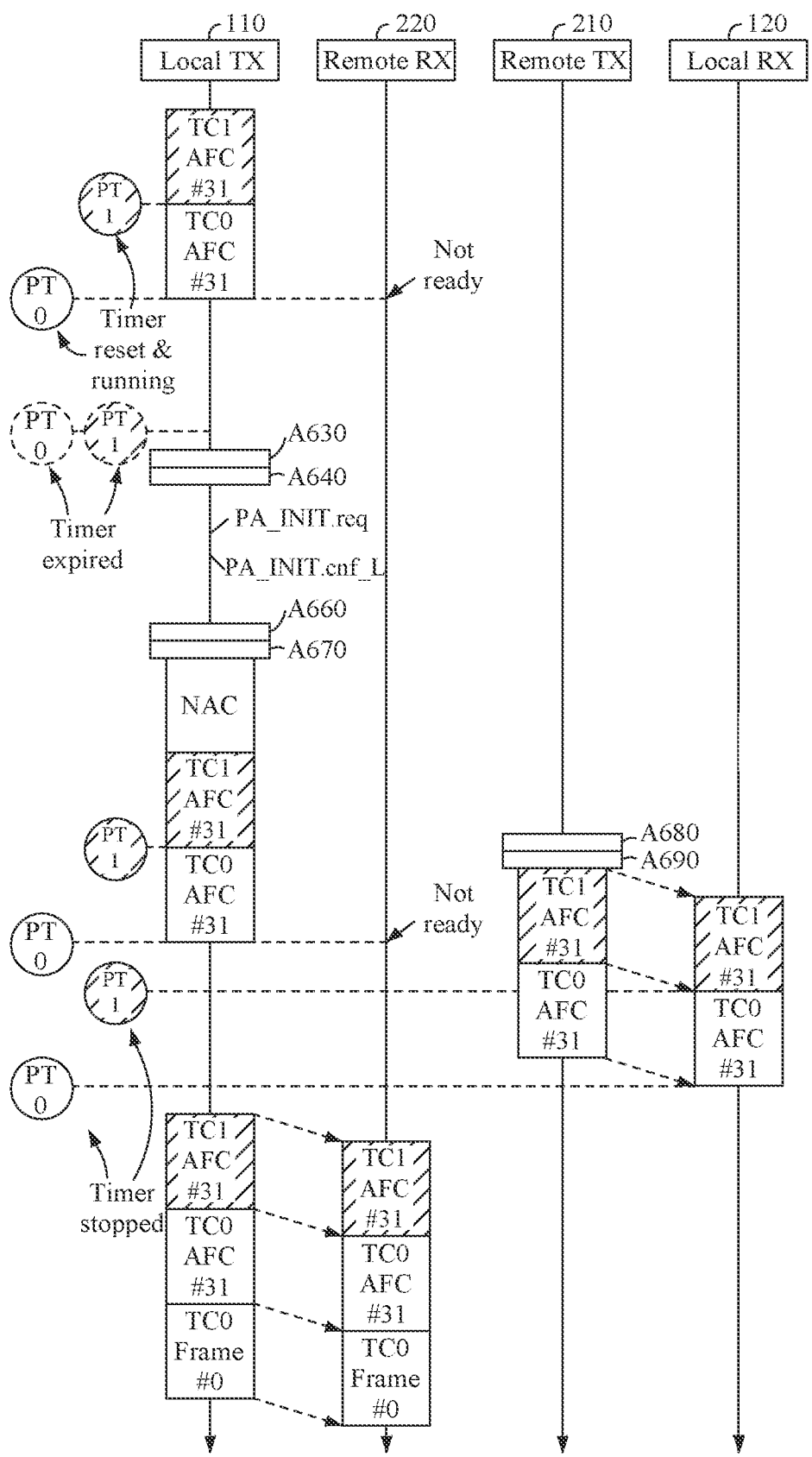
FIG. 14 is a diagram illustrating an example of a process involving re-transmission triggered by expiration of a protection timer in an ALE mode where the method based on FIG. 6 is applied.

FIG. 14 illustrates an example of a process involving re-transmission triggered by expiration of a protection timer in an ALE mode where the method based on FIG. 6 is applied. In FIG. 14, expiration of a protection timer PTx triggers frame re-transmission, wherein the protection timer PTx, for example, FCx_PROTECTION_TIMER as exemplified in the UniPro specification, is represented by a circle with a legend of PTx, x is 0 for traffic class 0, and x is 1 for traffic class 1. The PA_INIT.req primitive is to be triggered for requesting link re-initialization if the protection timer (FCx_PROTECTION_TIMER) expires after being triggered by an AFCx Frame with CReq bit set to '1'. As shown in FIG. 14, before triggering the PA_INIT.req primitive (or performing subsequent operations), the local TX 110 closes a current ALE burst and opens a new ALE burst, as indicated by operation A630 (or operation A660), and sends a lane alignment pattern using PA_ALE_LANE_ALIGN, as indicated by operation A640 (or operation A670). If a link re-initialization procedure corresponding to the PA_INIT.req primitive is successful, then a NAC frame is sent, and the Data Link Layer continues operations. If the counterpart (e.g., the second device 20 or remote RX 220) receives the NAC Frame correctly, the counterpart performs operations adhering to the process as illustrated in FIG. 9. That is, before performing one or more subsequent operations with respect to its local side (e.g., the first device 10 or local RX 120), the counterpart closes the ALE burst and opens a new ALE burst, as indicated by operation A300, and then performs a PA_ALE_LANE_ALIGN transmission, as indicated by operation A310, to send a lane alignment pattern. Then, the first device 10 or local TX 110 performs replay operation for TC0 frame #16.

The scenario of re-transmission triggered by expiration of FCx_PROTECTION_TIMER in FIG. 14 is described more specifically as follows. Initially, it is assumed that an ALE burst from the local TX 110 to the remote RX 220, or called a first burst transmission for the first device 10, and an ALE burst from the remote TX 210 to the local RX 120, or called a first burst transmission for the second device 20, are established in an advanced line encoding mode. The scenario of FIG. 14 can be used in an initial credit exchange procedure for TC0 and TC1 for Data Link layer initialization in the interconnection protocol, with reference to the UniPro specification (e.g., version 2.0). Sending an AFC1 with the CReq bit set to '1' starts a protection timer PT1 (e.g., FC1_PROTECTION_TIMER). Sending an AFC0 with the CReq bit set to '1' starts another protection timer PT0 (e.g., FC0_PROTECTION_TIMER). The remote end (e.g., second device 20 or remote RX 220), however, is not ready to receive data. Then, both the protection timers PT1 and PT0 expire, wherein the protection timers that have expired are shown with respective dashed circles. Because of the expiration of the protection timers PT1 and PT0, the local TX 110 is to trigger link re-initialization. Before triggering the PA_INIT.req primitive, the local TX 110 closes the current ALE burst, or the first burst transmission for the first device 10, and opens a new ALE burst, or called a second burst transmission for the first device 10, as indicated by operation A630, and sends a lane alignment pattern using PA_ALE_LANE_ALIGN, as indicated by operation A640, so as to ensure that the link is reliable for data transmission. The local TX 110 then sends the PA_INIT.req primitive to request for link re-initialization. After reception of PA_INIT.cnf_L indicating that a successful initialization procedure is completed, the local TX 110 is to transmit a NAC Frame. Before transmitting a NAC frame, the local TX 110 closes the current ALE burst, or the second burst transmission for the first device 10) and opens a new ALE burst, or called a third burst transmission for the first device 10, as indicated by operation A660, and sends a lane alignment pattern using PA_ALE_LANE_ALIGN, as indicated by operation A670, so as to ensure that the link is reliable for data transmission. After that, the local TX 110 re-transmits an AFC1 with the CReq bit set to '1' and an AFC0 with the CReq bit set to '1', wherein the protection timers PT1 and PT0 of the local TX 110 start. The remote end (e.g., second device 20 or remote RX 220) is not ready to receive data. Meanwhile, the protection timers PT1 and PT0 of the local end (e.g., first device 10) are running. On the other hand, the remote TX 210 closes the current ALE burst, or the first burst transmission for the second device 20, and opens a new ALE burst, or called a second burst transmission for the second device 20, as indicated by operation A680, and sends a lane alignment pattern using PA_ALE_LANE_ALIGN, as indicated by operation A690, to ensure data transmission with the local RX 120. The remote TX 210 then transmits an AFC1 with the CReq bit set to '1' and an AFC0 with the CReq bit set to '1', wherein protection timers PT1 and PT0 (not shown) of the remote end start. The local RX 120 receives the AFC1 and AFC0 and receives credits carried by the AFC1 and AFC0, wherein the credits satisfy respective thresholds. Thus, the protection timers PT1 and PT0 of the local end (e.g., first device 10) are stopped as shown in FIG. 14 and data link layer initialization is completed. Afterwards, the local TX 110 transmits an AFC 1 with the CReq bit set to '1' and an AFC0 with the CReq bit set to '1'. The remote RX 220 receives the AFC1 and AFC0 and receives credits carried by the AFC1 and AFC0, wherein the credits satisfy respective thresholds. Thus, the protection timers PT1 and PT0 (not shown) of the remote end are stopped and data link layer initialization is completed. The local TX 110 then can send a normal data frame, such as "TC0 Frame #0", as shown in FIG. 14.

As described in the above example related to FIG. 14, the re-transmission is triggered by expiration of FC0_PROTECTION_TIMER and FC1_PROTECTION_TIMER. This example also shows that the method of FIG. 11 or the process of FIG. 12 is capable of facilitating error handling, such as an initial credit exchange procedure for TC0 and TC1 for Data Link layer initialization in the interconnection protocol.

As mentioned in the above embodiments, closing a burst transmission and opening a new burst transmission are performed in an ALE mode. Regarding closing (or ending) a burst transmission, a "burst end" operation is performed as following in an embodiment.

First, at least one end-of-burst symbol is transmitted after the last symbol. The end-of-burst symbol can be any suitable data sequence or symbol, such as an M-PHY End-of-Burst marker (MK2 symbol).

Then, a plurality of symbols indicating trailing (or called trailing symbols) are transmitted for a time interval based on a unit of data transmission for an ALE mode. Taking the above ALE blocks as an example, the unit of data transmission for an ALE mode is an ALE block so that the time interval can be set to a plurality of clock cycles for at least one or more ALE blocks. A new Attribute indicating trailing can be set for an ALE mode, for example, and denoted by 'PA_TxTrailingBlocks'. For example, PA_TxTrailingBlocks can be set to a value of '1' or '2' or so on. When PA_TxTrailingBlocks equals 2, for example, the time interval for which the trailing symbols are transmitted corresponds to clock cycles of 2 ALE blocks. In addition, the trailing symbols can be set to any suitable data sequence or symbols, such as FILLER symbols (FLR) or other symbols as long as both the transmitting side and receiving side employ the trailing symbols consistently.

After that, an end-of-burst request is issued to the physical layer to end the signaling of the burst transmission. For example, a request derived from or similar to M-LANE-BurstEnd.request as mentioned in M-PHY specification (e.g., M-PHY version 5.0 or so on) can be used as the end-of-burst request.

In an embodiment of closing a burst transmission in an ALE mode, the PA Layer on the transmitting side aligns MK2 symbols across Lanes using <FLR, FLR> symbol pairs, if necessary. Then, the PA Layer on the transmitting side aligns FLR symbols to block boundary after MK2 symbols. Afterward, the PA Layer on the transmitting side do PA_TxTrailingBlocks trailer block sending.

Figure 15:
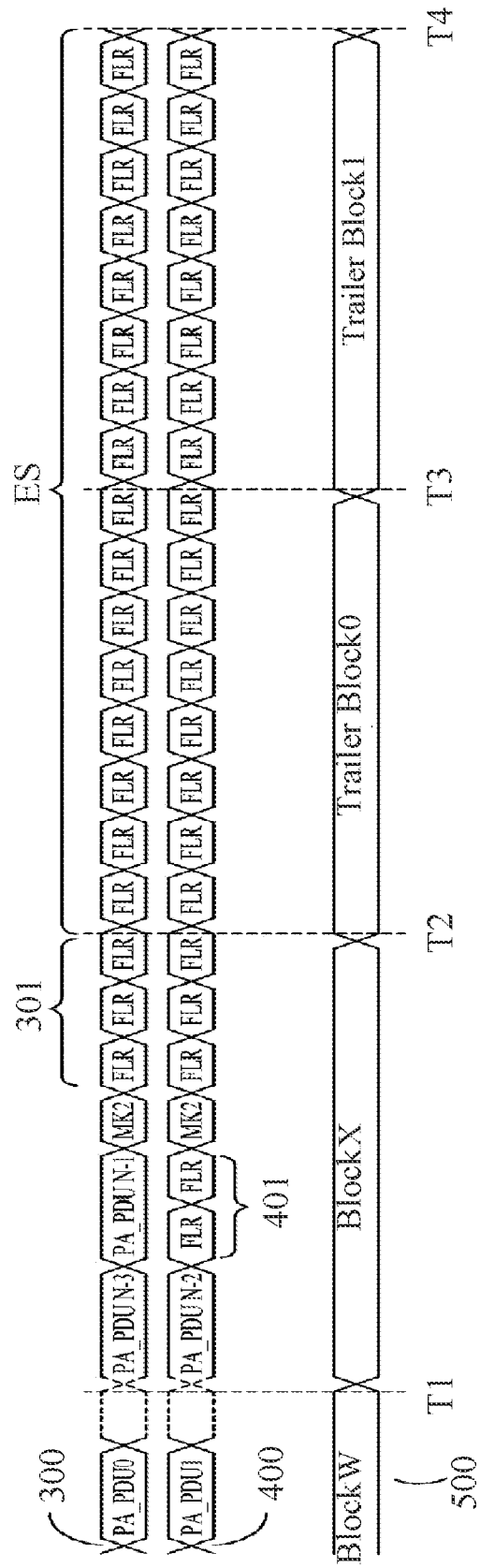
FIG. 15 is a diagram illustrating an embodiment of closing a burst transmission in an ALE mode.

It is noted that closing a burst transmission in an ALE mode (or called an ALE burst transmission) differs from closing a conventional burst transmission based on 8b/10b encoding scheme in a legacy mode in that closing a burst transmission includes transmitting an end-of-burst sequence for a time interval based on a unit of information for data transmission according to the advanced line encoding. Referring to FIG. 15, an embodiment of closing a burst transmission in an ALE mode is illustrated. In FIG. 15, two burst data signals 300 and 400 represent data actually transmitted through two active lanes while a waveform 500 illustrates the transmission of ALE blocks, such as BlockW and BlockX, associated with the burst data signals 300 and 400. In the last ALE block for data transmission (i.e., BlockX), an odd Number of PA layer symbols (PA_PDUs), such as PA_PDU0, PA_PDU1 and so on, are transmitted through the two active lanes, as illustrated by PA_PDU N−3, PA_PDU N−2, and PA_PDU N−1 between time points T1 and T2. An end-of-burst sequence (denoted by ES) is transmitted for a time interval of 2 ALE blocks (e.g., PA_TxTrailingBlocks=2; total 16 clock cycles), associated with a trailer Block0 between time points T2 and T3 and a trailer Block1 between time points T3 and T4. In addition, in the burst data signal 300 or 400, the tail of burst is padded with FLR symbols 301 to align the BlockX while in the burst data signal 400, the tail of burst is padded with FLR symbols 401 to align the MK2 symbols.

Accordingly, an end-of-burst sequence having the trailing symbols transmitted for a time interval based on the unit of data transmission in an ALE mode, such as trailer Block0 and Block1, are capable of facilitating the receiving side of the ALE burst transmission to receive signals of sufficient clock cycles serving as clock signals for the receiving side to process the last ALE block (e.g., BlockX).

Regarding opening a burst transmission, in an embodiment, a PA_ALE_LANE_ALIGN can be used as an opening sequence to open a burst transmission and informs the receiving side that a burst transmission is opened and the transmitting side is ready for alignment with the lane alignment pattern used by PA_ALE_LANE_ALIGN.

Certainly, it is noted that the implementation of closing a burst transmission or opening a new burst transmission is not limited to the above examples of symbols or sequence such as MK2, FLR symbols or so on because any appropriate symbols or sequence can be adopted as long as both the transmitting side and receiving side employ the adopted symbols consistently.

The following provides various embodiments for implementation of the interconnection protocol with the ALE according to FIG. 1.

Figure 16A:
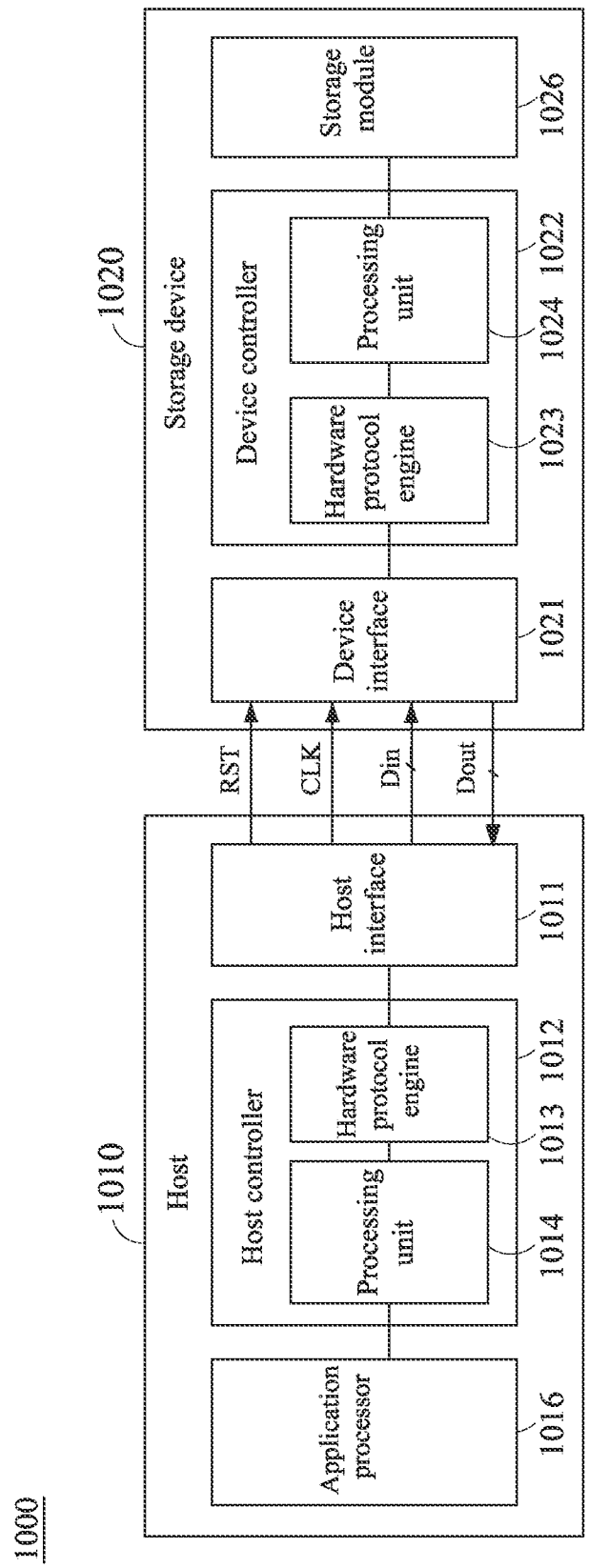
FIG. 16A is a diagram illustrating circuit architecture of a storage system for an interconnection protocol capable of performing ALE according to an embodiment of the present invention.
Figure 16B:
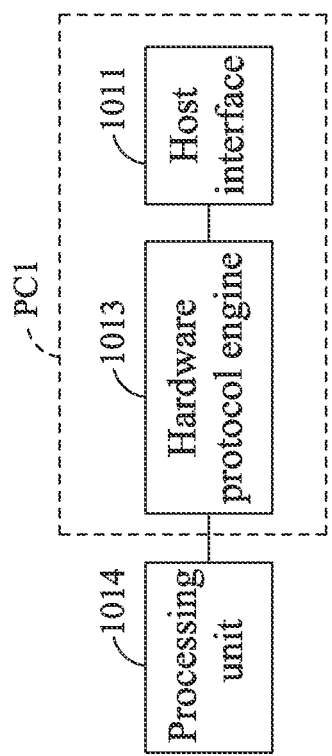
FIG. 16B is a block diagram illustrating circuit architecture applicable to the controller in FIG. 16A for the interconnection protocol according to an embodiment of the present invention.
Figure 16C:
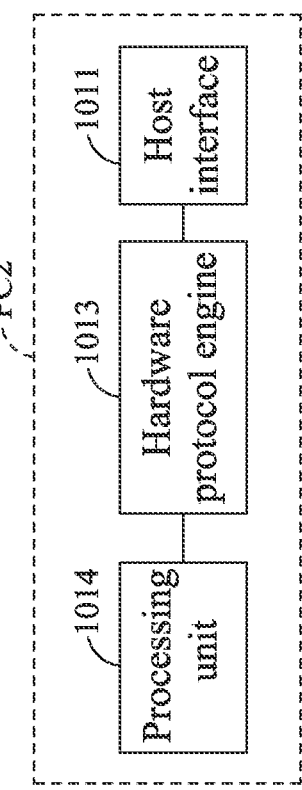
FIG. 16C is a block diagram illustrating circuit architecture applicable to the controller in FIG. 16A for the interconnection protocol according to an embodiment of the present invention.

Referring to FIG. 16A, a diagram of circuit architecture is shown according to an embodiment of the present invention. As shown in FIG. 16A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing an ALE as mentioned above based on FIG. 1 or any one or more of the embodiments above. According to the circuit architecture in FIG. 16A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 16A, a controller in the host 1010 or the storage device 1020 used to implement the interconnection protocol may be implemented by various configurations. As shown in FIG. 16A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 16B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 16C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 16A, the controller used to implement the interconnection protocol in the host 1010 or the storage device 1020 can be regarded to cover or represent the embodiment based on FIG. 16A, FIG. 16B, or FIG. 16C. The description of other examples related to FIG. 16A is also suitable for the embodiments based on FIG. 16A, FIG. 16B, or FIG. 16C.

The circuit architecture shown in FIG. 16A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it sends a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer.

The processing unit 1014 is coupled to the hardware protocol engine 1013, and communicates with the application processor 1016. The processing unit 1014 can execute one or more pieces of firmware. For example, an access operation command or write data sent by an operating system, a driver, or an application executed by the application processor 1016 is converted into a command or data in a format compliant with the link layer of the interconnection protocol by the firmware executed by the processing unit 1014, and is then sent to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented at the hardware protocol engine 1013 by hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and sends an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 16A, the host interface 1011 can be coupled to the device interface 1021, for example, through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane. The host interface 1011 can communicate with the device interface 1021 by using at least one interface protocol based on an advanced line encoding scheme, such as 128b/130b or 128b/132b coding scheme or so on; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be implemented according to a modified version of the UniPro specification, and the physical layer of the UIC layer can be implemented according to a modified version of the M-PHY specification. Under the interconnection protocol, since the implementations of the modified UniPro and modified M-PHY with respect to the ALE are hidden from the other layers (such as UCS, UTP layers) of the UFS standard, the PHY adapter layer SAP model for ALE as illustrated in FIG. 3 facilitates the implementation of the interconnection protocol with the ALE and reduces its implementation complexity.

Figure 17:
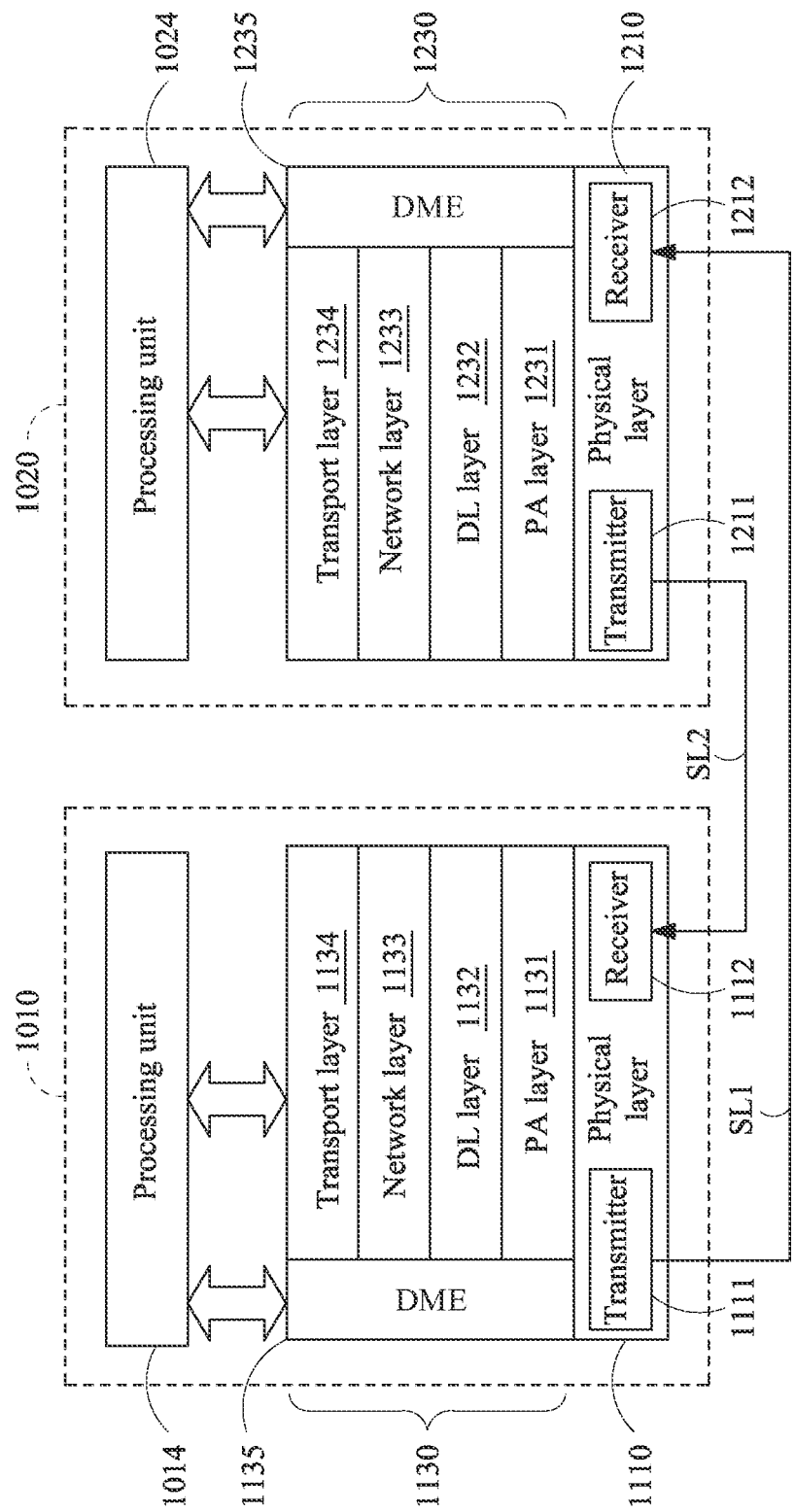
FIG. 17 is a schematic diagram of a layered structure of the storage system in FIG. 16A according to the interconnection protocol capable of performing ALE.

Referring to FIG. 17, a schematic diagram of layered architecture of the storage system in FIG. 16A is shown according to the UFS standard and FIG. 1. Because the UFS standard is based on the MIPI UniPro layer and the MIPI M-PHY layer, the host interface 1011 and the hardware protocol engine 1013 of the host 1010 shown in FIG. 16A are respectively used to implement a modified physical layer 1110 and a modified UniPro layer 1130 in FIG. 17. The modified physical layer 1110 and modified UniPro layer 1130 are the corresponding layers in the host as shown in FIG. 1. Also, the device interface 1021 and the hardware protocol engine 1023 of the storage device 1020 in FIG. 16A are respectively used to implement a modified physical layer 1210 and a modified UniPro layer 1230 in FIG. 17. Likewise, the modified physical layer 1210 and modified UniPro layer 1230 are the corresponding layers in the device as shown in FIG. 1.

As shown in FIG. 17, the modified UniPro layer 1130 (or 1230) can include a modified PHY adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified PHY adapter layer (1131 or 1231) couples the modified physical layer (1110 or 1210) to the data link layer (1132 or 1232). The modified PHY adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified PHY adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power consumption mode change.

Figure 18:
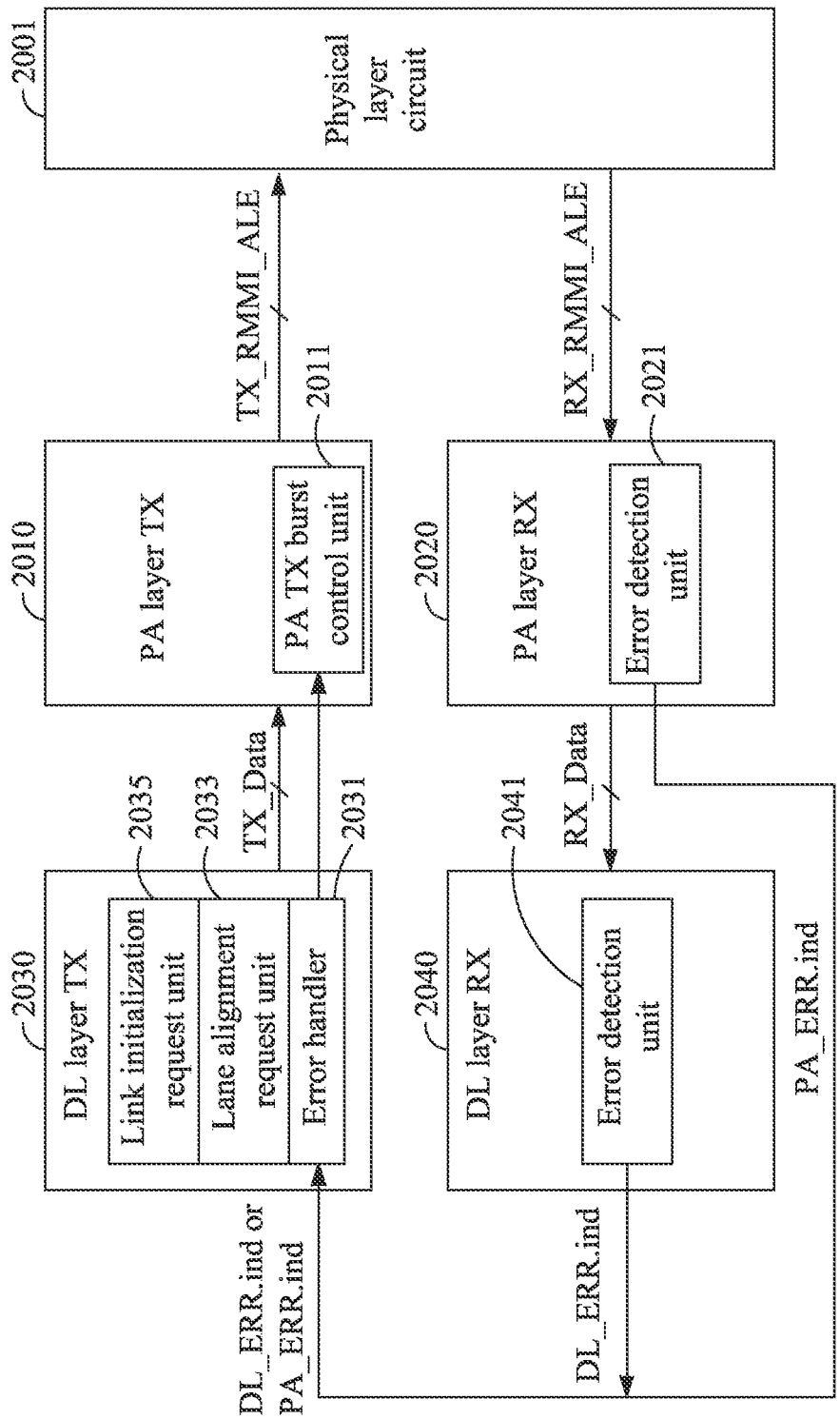
FIG. 18 is a schematic diagram illustrating circuit architecture for implementation of error handling in an ALE mode with respect to the DL layer and PA layer of the interconnection protocol with ALE according to an embodiment.

FIG. 18 illustrates circuit architecture for implementation of error handling in an ALE mode with respect to the DL layer and PA layer of the interconnection protocol with ALE according to an embodiment. The circuit architecture can be applied to a controller in FIG. 16A for an electronic device (e.g., the first device 10 or second device 20 of one or more embodiments above) to facilitate implementation of error handling in an ALE mode. As shown in FIG. 18, the circuit architecture includes a PA layer transmitter (TX) 2010, a PA layer receiver (RX) 2020, a DL layer transmitter (TX) 2030, and a DL layer receiver (RX) 2040. The DL layer TX 2030 is coupled to the PA layer TX 2010 through a bus, denoted by TX_Data. The PA layer TX 2010 is coupled to a physical layer circuit 2001, for example, an interface circuit for implementing the physical layer of the interconnection protocol, through a bus for data transmission, wherein this bus may be, for example, a reference M-PHY module interface (RMMI) for transmission for ALE, denoted by TX_RMMI_ALE, with 80-bit bus width or more. The physical layer circuit 2001 is coupled to the PA layer RX 2020 through a bus for data reception, wherein this bus may be, for example, an RMMI for reception for ALE, denoted by RX_RMMI_ALE, with 80-bit bus width or more. The PA layer RX 2020 is coupled to the DL layer RX 2040 through a bus, denoted by RX_Data.

The circuit architecture can be applied to a controller in FIG. 16A to perform operations according to one or more of the embodiments of FIGS. 6-14 or related examples. The following provides embodiments in this regard.

In some embodiments, when an error is being detected by the PA Layer RX 2020 or DL Layer RX 2040, an error indicator is propagated to the DL Layer TX 2030 to do error handling in the advanced line encoding mode. In an embodiment, the PA layer RX 2020 includes an error detection unit 2021, for example, capable of detecting errors in received data in the PA layer and sending an error indicator to the DL layer TX 2030 by using a primitive, denoted by PA_ERR.ind. The PA_ERR.ind primitive can be similar to or derived from that described in the UniPro specification, such as the previous example of PA_ERROR.ind related to TABLE 4. In an embodiment, the DL layer RX 2040 includes an error detection unit 2041, for example, capable of detecting errors in received data in the DL layer and sending an error indicator to the DL layer TX 2030 by using a primitive, denoted by DL_ERR.ind. The DL_ERR.ind primitive is an internal primitive to inform DL layer TX 2030 when an error event is detected in the DL layer RX 2040. The error event may indicate that an error in a frame is detected or a replay timer or protection timer expires, as mentioned in one or more of the embodiments of FIGS. 6-14, wherein the error may be such as SOF, EOF, CRC error, or wrong sequence number, or so on.

In an embodiment, the DL layer TX 2030 includes an error handler 2031 for handling errors detected by the PA Layer RX 2020 or DL Layer RX 2040. The DL layer TX 2030 or the error handler 2031 can be implemented as a circuit to perform error handling operations according to one or more of the embodiments of FIGS. 6-14 or related examples, with respect to the DL layer. The error handler 2031, for example, performs the corresponding error handling operations when the PA Layer RX 2020 asserts a flag associated with the PA_ERR.ind primitive due to an error detected in the PA layer or the DL Layer RX 2040 asserts a flag associated with the DL_ERR.ind primitive due to an error detected in the DL layer.

In an embodiment, the DL layer TX 2030 (or the error handler 2031) includes a lane alignment request unit 2033 for ALE that utilizes a service access point (e.g., PA_ALE_LANE_ALIGN) to send a lane alignment pattern in the advanced line encoding mode, instead of PA_LANE_ALIGN. The DL layer TX 2030 or the lane alignment request unit 2033 can be implemented as a circuit to send a lane alignment request for ALE to the PA layer TX 2010 by using the PA_ALE_LANE_ALIGN.

In addition, in an embodiment, the DL Layer TX 2030 sends at least one request for burst closing and burst opening to the PA layer TX 2010 before sending the lane alignment request for ALE to the PA layer TX 2010 by using the PA_ALE_LANE_ALIGN.

In addition, in an embodiment, the PA layer TX 2010 includes a PA TX burst control unit 2011 for receiving the burst closing and opening request and the lane alignment request sent from the layer TX 2030. The PA layer TX 2010 or PA TX burst control unit 2011 can be implemented as a circuit to perform burst closing and opening and send a lane alignment pattern in the advanced line encoding mode, as described in the previous example of the PA_ALE_LANE_ALIGN.

In addition, as shown in FIG. 18, the DL layer TX 2030 includes a link initialization request unit 2035 for requesting link initialization. The DL layer TX 2030 or link initialization request unit 2035 can be implemented as a circuit to perform burst closing and opening and sends a PA_INIT.req primitive to request to (re-)initialize the PA layer and underlying physical layer of the interconnection protocol. The interconnection protocol with the ALE can be derived from the link re-initialization procedure according to or derived from the UniPro specification (e.g., version 2.0).

In the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

As described above, various embodiments of a method for an interconnection protocol capable of performing an advanced line coding, a controller, and an electronic device (such as a host or a storage device) are provided.

The present disclosure is described by way of the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method for facilitating frame error handling in an electronic device capable of communicating with another electronic device, the method comprising:
   in response to an error event in an advanced line encoding mode, closing a first burst transmission and opening a second burst transmission, wherein the advanced line encoding mode indicates that the electronic device is capable of data transmission by using an advanced line encoding having a higher effective data rate as compared to 8b/10b encoding;
   transmitting a first lane alignment pattern in the advanced line encoding mode from the electronic device to the other electronic device after the second burst transmission is opened; and
   transmitting a negative acknowledgement control (NAC) frame in the advanced line encoding mode from the electronic device to the other electronic device after a second lane alignment pattern that follows the first lane alignment pattern is transmitted.

2. The method according to claim 1, wherein the error event indicates that a data frame received by the electronic device in the advanced line encoding mode has an error.

3. The method according to claim 2, wherein the NAC frame is capable of triggering re-transmission of the data frame at the other electronic device.

4. The method according to claim 1, wherein the error event indicates that the electronic device does not receive an acknowledgment in the advanced line encoding mode within a time interval after transmitting a frame, wherein the frame is an unacknowledged transmitted frame.

5. The method according to claim 1, the method further comprising:

sending a request to perform link re-initialization after the first lane alignment pattern is transmitted;

closing the second burst transmission and opening a third burst transmission in the advanced line encoding mode after the link re-initialization is performed; and transmitting the second lane alignment pattern in the advanced line encoding mode from the electronic device to the other electronic device after the third burst transmission is opened, wherein the NAC frame is transmitted after the second lane alignment pattern is transmitted.

6. The method according to claim 4, wherein the error event is capable of triggering re-transmission of the unacknowledged transmitted frame at the electronic device after the NAC frame is transmitted.

7. The method according to claim 1, wherein the advanced line encoding is based on a 128b/129b line encoding, 128b/130b line encoding, 128b/132b line encoding, 256b/257b line encoding, 256b/258b line encoding, or 256b/260b line encoding.

8. The method according to claim 1, wherein closing the first burst transmission includes transmitting an end-of-burst sequence for a time interval based on a unit of information for data transmission according to the advanced line encoding.

9. An electronic device, operable to communicate with another electronic device, the electronic device comprising:

a controller capable of, in response to an error event in an advanced line encoding mode, closing a first burst transmission and opening a second burst transmission, wherein the advanced line encoding mode indicates that the electronic device is capable of data transmission by using an advanced line encoding having a higher effective data rate as compared to 8b/10b encoding, wherein the controller is capable of transmitting a first lane alignment pattern in the advanced line encoding mode from the electronic device to the other electronic device after the opening of the second burst transmission and transmitting a negative acknowledgement control (NAC) frame in the advanced line encoding mode from the electronic device to the other electronic device after the transmitting of a second lane alignment pattern that follows the first lane alignment pattern.

10. The electronic device according to claim 9, wherein the error event indicates that a data frame received by the electronic device has an error.

11. The electronic device according to claim 10, wherein the NAC frame is capable of triggering re-transmission of the data frame at the other electronic device.

12. The electronic device according to claim 9, wherein the error event indicates that the electronic device does not receive an acknowledgment in the advanced line encoding mode within a time interval after transmitting a frame, wherein the frame is an unacknowledged transmitted frame.

13. The electronic device according to claim 9, wherein the controller is further capable of performing operations including:

sending a request to perform link re-initialization after the first lane alignment pattern is transmitted;

closing the second burst transmission and opening a third burst transmission in the advanced line encoding mode after the link re-initialization is performed; and transmitting the second lane alignment pattern in the advanced line encoding mode from the electronic device to the other electronic device after the third burst transmission is opened, wherein the NAC frame is transmitted after the second lane alignment pattern is transmitted.

14. The electronic device according to claim 12, wherein the error event is capable of triggering re-transmission of the unacknowledged transmitted frame at the electronic device after the NAC frame is transmitted.

15. The electronic device according to claim 9, wherein the advanced line encoding is based on a 128b/129b line encoding, 128b/130b line encoding, 128b/132b line encoding, 256b/257b line encoding, 256b/258b line encoding, or 256b/260b line encoding.

16. The electronic device according to claim 9, wherein the controller is capable of transmitting an end-of-burst sequence for a time interval based on a unit of information for data transmission according to the advanced line encoding when closing the first burst transmission.

* * * * *